(12) United States Patent
Huntley et al.

(10) Patent No.: US 11,580,813 B2
(45) Date of Patent: Feb. 14, 2023

(54) CONTACTLESS LOCKER SYSTEM AND METHOD

(71) Applicant: Lavii, Inc., Temple Hills, MD (US)

(72) Inventors: Rea Huntley, Clinton, MD (US); James Bagley, Bowie, MD (US); Marcus Gunn, Accokeek, MD (US)

(73) Assignee: Lavii, Inc., Temple Hills, MD (US)

( * ) Notice: Subject to any disclaimer, the term of this patent is extended or adjusted under 35 U.S.C. 154(b) by 157 days.

(21) Appl. No.: 16/930,490

(22) Filed: Jul. 16, 2020

(65) Prior Publication Data

US 2021/0049858 A1 Feb. 18, 2021

Related U.S. Application Data

(60) Provisional application No. 62/887,531, filed on Aug. 15, 2019.

(51) Int. Cl.
*A47G 29/14* (2006.01)
*G07F 17/00* (2006.01)
*G06Q 10/04* (2012.01)
*G06Q 20/32* (2012.01)
*G06Q 50/12* (2012.01)

(52) U.S. Cl.
CPC ......... *G07F 17/0064* (2013.01); *G06Q 10/04* (2013.01); *G06Q 20/3274* (2013.01); *G06Q 50/12* (2013.01)

(58) Field of Classification Search
CPC ............ A47G 29/141; A47G 2029/147; A47G 2029/142
USPC ......................................................... 235/381
See application file for complete search history.

(56) References Cited

U.S. PATENT DOCUMENTS

| 6,842,719 | B1 | 1/2005 | Fitzpatrick et al. |
| 2015/0186840 | A1 | 7/2015 | Torres et al. |
| 2018/0374045 | A1* | 12/2018 | Chau .................... G07G 1/0036 |
| 2019/0051090 | A1* | 2/2019 | Goldberg ............... G07F 11/46 |
| 2019/0279181 | A1* | 9/2019 | Kelly .................... G06Q 20/12 |
| 2019/0362302 | A1* | 11/2019 | Deemter ............ G07C 9/00912 |
| 2020/0237119 | A1* | 7/2020 | Jakubowski .......... A47J 39/006 |
| 2020/0258139 | A1* | 8/2020 | Chen .................... G06Q 10/02 |

FOREIGN PATENT DOCUMENTS

WO 2020/047018 3/2020

* cited by examiner

*Primary Examiner* — Paultep Savusdiphol
(74) *Attorney, Agent, or Firm* — Miller IP Law

(57) ABSTRACT

A contactless locker system includes a set of laterally adjacent lockers that includes a first locker configured to store a first food item prepared by a restaurant. The first locker includes a first door that automatically opens and closes without a user physically touching the first door and a second door that automatically opens and closes without a user physically touching the second door.

20 Claims, 15 Drawing Sheets

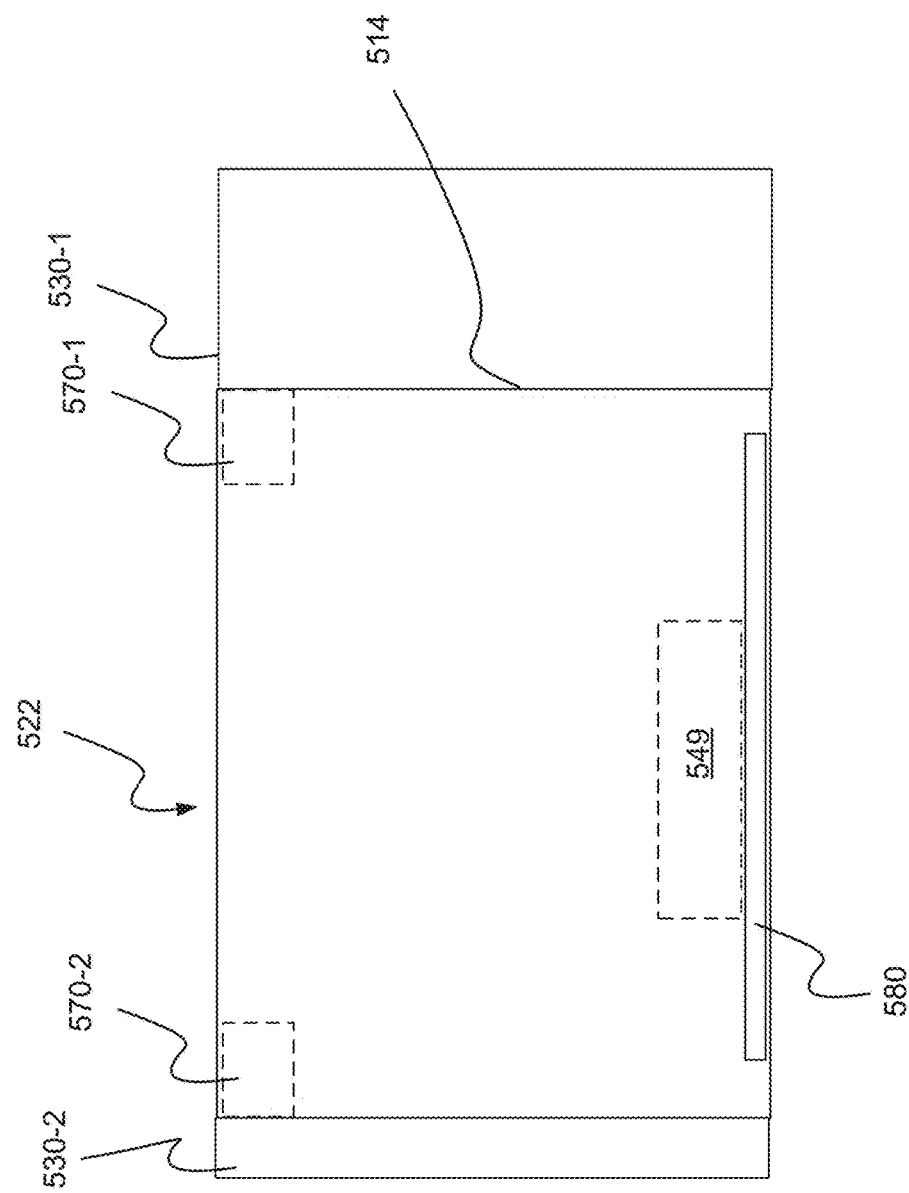

900

900-1

900-2

900-3

900-4

900-5

1000

1000-1

1000-2

1000-3

1000-4

1000-5

CONTACTLESS LOCKER SYSTEM AND METHOD

CROSS-REFERENCE RELATED APPLICATIONS

This present application claims priority to U.S. Provisional Application Ser. No. 62/887,531, entitled "Smart Goods Retrieval System and Method," filed on Aug. 15, 2019. The above-referenced application is hereby incorporated by reference for all purposes.

BACKGROUND

There are various concerns about the retrieval of ordered goods and/or food by a customer. For example, when a customer orders food from a restaurant, the customer may have to wait in line at the restaurant to pick up the ordered food. The wait time for the customer may, be undesirable. Moreover, the restaurant may provide the customer with an estimated time until the food is ready for pick-up. However, the estimated times are often inaccurate and unnecessarily mislead the customer as to when the food is ready for pick-up.

In another example, an order of goods may be delivered outside of the customer's residence. However, the goods are placed in open sight and may be easily stolen from in front the customer's residence.

In a further example, ordered goods and/or food may be placed in a secure locker for subsequent retrieval by the customer. However, the person placing the goods/food within the secured locker may be required to physically touch a door of the locker to open/close the locker door. Similarly, the customer retrieving the goods/food may also be required to physically touch the locker door to retrieve the goods/food from the locker. As such, germs from the person(s) touching the locker door may be transferred to other person(s) that subsequently touch the locker door.

BRIEF DESCRIPTION OF DRAWINGS

The present description will be understood more fully from the detailed description given below and from the accompanying drawings of various embodiments of the present embodiment, which description is not to be taken to limit the present embodiment to the specific embodiments but are for explanation and understanding. Throughout the description the drawings may be referred to as drawings, figures, and/or FIGS.

FIG. 5D illustrates a side-view locker of a contactless locker system, according to an embodiment.

DETAILED DESCRIPTION

Figure 1:
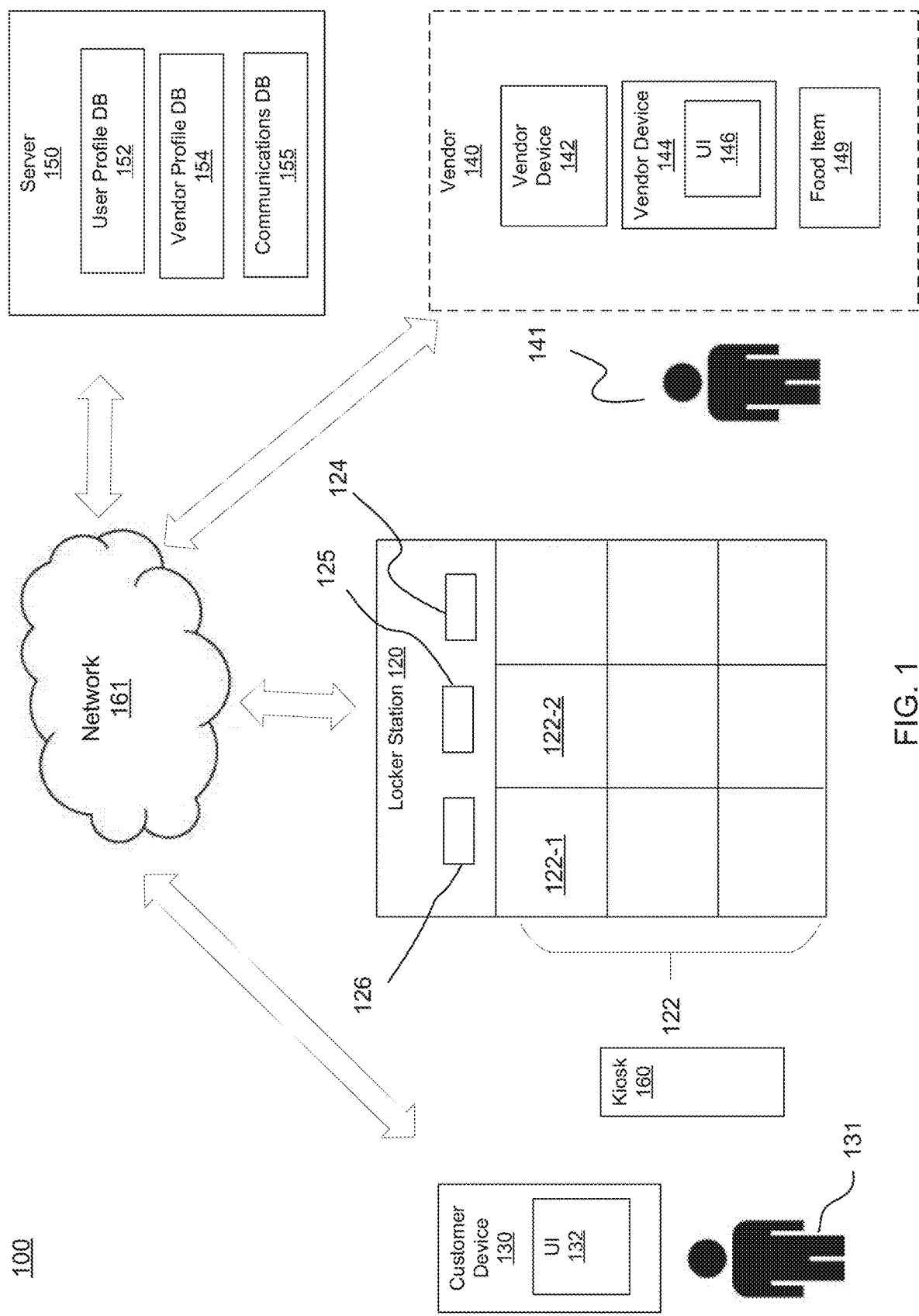
FIG. 1 illustrates a contactless locker system, according to an embodiment.

Methods, devices and systems related to a contactless locker system for storing and retrieving goods and/or food as disclosed herein will become better understood through a review of the following detailed description in conjunction with the figures. The detailed description and figures provide merely examples of the various embodiments described herein. Those skilled in the art will understand that the disclosed examples may be varied, modified, and altered and not depart from the scope of the embodiments described herein. Many variations are contemplated for different applications and design considerations; however, for the sake of brevity, the contemplated variations may not be individually described in the following detailed description.

Throughout the following detailed description, example embodiments of various methods, devices and systems for a contactless locker system for storing and retrieving goods and/or food are provided. Related elements in the example embodiments may be identical, similar, or dissimilar in different examples. For the sake of brevity, related elements may not be redundantly explained in multiple examples except to highlight dissimilar features. Instead, the use of a same, similar, and/or related element names and/or reference characters may cue the reader that an element with a given name and/or associated reference character may be similar to another related element with the same, similar, and/or related element name and/or reference character in an example embodiment explained elsewhere herein. Elements specific to a given example may be described regarding that particular example embodiment.

A person having ordinary skill in the art will understand that a given element need not be the same and/or similar to the specific portrayal of a related element in any given figure or example embodiment in order to share features of the related element. As used herein "same" means sharing all features and "similar" means sharing a substantial number of features or sharing materially important features even if a substantial number of features are not shared. As used herein "may" should be interpreted in the permissive sense and should not be interpreted in the indefinite sense. Additionally, use of "is" regarding embodiments, elements, and/or features should be interpreted to be definite only regarding a specific embodiment and should not be interpreted as definite regarding the invention as a whole. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, and Abstract.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not be redundantly labeled. A person having ordinary skill in the art will recognize based on the disclosure herein redundant and/or duplicated elements of the same FIG. Despite this, redundant labeling may be included where helpful in clarifying the structure of the depicted example embodiments.

As used herein regarding a list, "and" forms a group inclusive of all the listed elements. For example, an embodiment described as including A, B, C, and D is an embodiment that includes A, includes B, includes C, and also includes D. As used herein regarding a list, "or" forms a list of elements, any of which may be included. For example, an embodiment described as including A, B, C, or D is an embodiment that includes any of the elements A, B, C, and D. Unless otherwise stated, an embodiment including a list of alternatively-inclusive elements does not preclude other embodiments that include various combinations of some or all of the alternatively-inclusive elements. An embodiment described using a list of alternatively-inclusive elements includes at least one element of the listed elements. However, an embodiment described using a list of alternatively-inclusive elements does not preclude another embodiment that includes all of the listed elements. And, an embodiment described using a list of alternatively-inclusive elements does not preclude another embodiment that includes a combination of some of the listed elements. As used herein regarding a list, "and/or" forms a list of elements inclusive alone or in any combination. For example, an embodiment described as including A, B, C, and/or D is an embodiment that may include: A alone; A and B; A, B and C; A, B, C, and D; and so forth. The bounds of an "and/or" list are defined by the complete set of combinations and permutations for the list.

A conventional locker system may require a user to physically touch a door of locker to open the door and/or require the user to physically touch the door to close the door. This may cause contaminants from a first user's hands to be deposited on the door. A subsequent user may also be required to touch the door. As such, the contaminants on the door may be transferred to the subsequent user's hands.

Additionally, vendors, such as restaurants, that utilized open shelf systems lack security and attempt to provide accurate estimates of pickup times. However, the estimates are often inaccurate which increases the time a customer has to wait within the establishment in order to pick up their food.

Implementations of the disclosure address the above-mentioned deficiencies and other deficiencies by providing methods, systems, devices, or apparatuses for a contactless locker system. In one embodiment, a locker system, includes a set of laterally adjacent lockers that includes a first locker configured to store a first food item prepared by a restaurant. The first locker may include a first door that automatically opens and closes without a user physically touching the first door and a second door that automatically opens and closes without a user physically touching the second door.

FIG. 1 illustrates a contactless locker system 100 (also referred to herein as "system 100"). The system 100 includes a locker station 120 includes a set of laterally adjacent lockers 122 (also referred to herein as "lockers 122"). The lockers 122 are for storing and retrieving goods that are placed within respective lockers in the lockers 122. In one embodiment, the locker station 120 may include a display 126 (also referred to herein as a user interface) that may display instructions to a customer 131 and/or user 141 (e.g., a person associated with the vendor 140).

The system 100 includes a vendor 140 (also referred to herein as an establishment). The vendor may be a location(s) where customers, such as customer 131 may request an order from. An order may be a request for one or more goods. For example, the goods may include but are not limited to a beverage or food, which is placed in connection with the purchase of the goods or service. Any type of establishment offering any type of goods may be available. Further, vendor 140 and a customer 131 may be in various geographical locations that are either located apart or are in proximity to each other. The term "vendor," described herein may refer to a vendor at a single location or multiple locations. Moreover, the term "vendor" may refer to separate and distinct vendors that are located at different locations. For example, vendor A is located at location A and vendor B (that is different than vendor A) is located at location B (which is different than location A).

Vendor 140 may provide for an assortment of unique and diverse selections for a customer 131 to select from. An order placed by user 131 may be processed by one or more user computing devices such as customer device 130, one or more servers such as server 150, and a vendor computing device such as vendor device 142 and/or vendor device 144. The various components listed above may be interconnected via a network such as network 161.

In various embodiments, vendor device 142, vendor device 144, customer device 130, server 150 and locker station 120 may be communicatively connected to network 161. In one or more embodiments, network 161 may include a local area network (LAN), such as a company Intranet, a metropolitan area network (MAN), or a wide area network (WAN), such as the Internet or World Wide Web. Network 161 may be a private network or a public network, or a combination thereof. Network 161 may be a telecommunications network, a wireless network (including Wi-Fi), and a wireline network. The network 161 may include mobile telephone networks utilizing any protocol or protocols used to communicate among vendor devices 142 and 144 and customer device 130, such as GSM, GPRS, UMTS, AMPS, TDMA, or CDMA. In some embodiments, different type of data may be transmitted via network 161 via different protocols.

Network 161 may further include a system of terminals, gateways, and routers. Network 161 may employ one or more cellular access technologies including 2nd (2G), 3rd (3G), $4^{th}$ (4G), 5th (5G), LTE, Global System for Mobil communication (GSM), General Packet Radio Services (GPRS), Enhanced Data GSM Environment (EDGE), and other access technologies that may provide for broader coverage between computing devices and establishment computing devices if for instance they are in a remote location not accessible by other networks.

The system 100 may include one or more servers such as server 150. In various embodiments, the server 150 may be located at various locations such, as at vendor 140, a remote data center, or any other location suitable for providing service to a network. The server 150 may comprise a database server such as MySQL® server. The system 100 may be distributed across multiple servers that may be in the same location or different locations in any arrangement. The server 150 may have several databases, including a database for storing data for users' profiles such as user profile database 152, vendor profiles such as vendor profile database 154, and communication between users such as communications database 156.

Server 150 may comprise several modules that provide various functions related to the system 100 using one or more computing devices like customer device 130 and vendor devices 142 and 144. The modules may be in the form of software or computer programs that interact with the operating system of server 150 whereby data collected in databases, may be processed by one or more processors within server 150 or another component of the system 100 as well as in conjunction with execution of one or more other computer programs. The modules may be configured to receive commands or requests from customer device 130, vendor devices 142 and 144, and locker station 120 and communicate appropriate responses to requesting customer device 130, vendor devices 142 and 144, and/or locker station 120.

Server 150 may run any number of algorithms to proactively respond to the conditions based on the locker station 120 settings or system assumptions, such as if the door of the locker station 120 is broken. If the authentication continuously fails more than three times within a set time-frame, the server 150 may automatically refer the customer 131 to use the kiosk 160. In this case, the system assumes the customer 131 needs to use the kiosk 160 for order pickup.

In one embodiment, a customer 131 orders a food item 149 from a vendor 140 (e.g., an establishment, a restaurant, etc.) via a network 161. For example, the customer 131 may select and order the food item from the customer device 130 (e.g., a mobile device).

The order of the food item 149 is received at the vendor device 142. Upon receipt of the order, the food item 149 is prepared by the vendor 140. Upon preparation of the food item 149, the food item 149 is placed into a locker 122-1 by user 141 (e.g., an employee of vendor 140).

In one embodiment, the user 141 uses the UI 146 of the vendor device 144 to select locker 122-1 as a locker that will be assigned to the food item 149. Once that is selected by the user 141 the controller 125 (e.g, a central processing unit) controls a door of locker 122-1 to automatically open. Upon placing the food item 149 into the locker 122-1, the controller 125 controls the door of the locker 122-1 to automatically close. As such, the food item 149 is securely stored in the locker 122-1 for pick up by the customer 131.

In one embodiment, the customer receives the scannable code (e.g., a QR code, barcode, etc.) via Short Message Service (SMS) or personal email once the user 141 places the order within the locker 122-1. When the customer 131 enters vendor 140, they will approach the locker station 120 to retrieve the food item 149 stored in the locker 122-1. The scannable code (e.g., a QR code, barcode, etc.) associated with the order of the food item 149 is displayed on the customer device 130. The customer 131 directs the scannable code to the scanner 124. In response to the scanner 124 scanning/reading the scannable code displayed on customer device 130, the controller 125 controls a door of the locker 122-1 to automatically open. Upon the customer 131 retrieving the food item 149 stored in the locker 122-1, the controller 125 controls the door of the locker 122-1 to automatically close. The automatic opening/closing of the door allows contents to be placed into the locker 122-1 without a person physically contacting the locker station 120. That is, a person is able to contactlessly place items in the locker 122-1. Similarly, the automatic opening/closing of the door allows contents to be retrieved from the locker 122-1 without a person physically contacting the locker station 120. That is, a person is able to contactlessly retrieve items from the locker 122-1.

In various embodiments, more than one vendor is able to place items within the locker station 120. For example, a first vendor 140 receives a first order of a first food item 149 from a first customer 131. The first food item is placed in the locker station (e.g., locker 122-1) by user 141. Additionally, a second vendor may receive a second order of a second food item from a second customer (or the first customer 131). The second food item is then placed in the locker station (e.g., locker 122-2) by another user associated with the second vendor.

In various embodiments, the locker station 120 may be comprised of a housing that protects the electronics and mechanical system as well as the goods while allowing the locker station 120 to be placed on the floor and other fixed surface structure. The housing is generally of an elongated rectangular form with a left side surface, right surface, exterior surface, top surface, bottom surface, and interior surface having a rugged and durable structure and presenting a pleasing and practical exterior. The housing is typically made of either metal or plastic but may be made of any material that does stray from the intention of the present invention. The housing may include one or more keyholes on the lockers in case locker station 120 has malfunctioned or in need of repair.

In one or more non-limiting embodiments, locker station 120 may be six (6) feet tall and six (6) feet wide with individual lockers that have a depth, width, length of fourteen (14) by fifteen (15) by fifteen (15). Locker station 120 may have locker identifier numbers to help locate the location of the individual locker among the lockers of locker station 120.

Locker station 120 may have a control system (e.g., controller 125) to control the actuation of the individual lockers within locker station 120 such as a door opening mechanism (e.g., an actuation device) to open said lockers. The control system may have similar computing devices to customer device 130 and vendor devices 142 and 144. The control system may be in the form of, a circuit board, a memory or other non-transient storage medium in which computer-readable coded instructions are stored and one or more processors configured to execute the instructions stored in the memory. Locker station 120 may have a wireless transmitter, a wireless receiver, and a related computer process executing on the processors.

The control system may also include an internet connection, network connection, and/or other wired or wireless means of communication (e.g., LAN, etc.) to interact with other components. The connection allows vendor 140 to update, control, send/retrieve information, monitor or otherwise interact passively or actively with locker station 120. The circuit board may have a microcontroller to store and run the needed programs on the software application. In some embodiments, a plurality of locker stations may communicate over system 100 and work in conjunction as a system. This may be helpful if one locker station no longer has any available lockers for goods or goods are too big for the first locker station 120 wherein user 131 may be redirected to other locker stations.

In one or more embodiments, one or more computing devices may be integrated into locker station 120, while in other embodiments, computing systems may be a remotely located computing systems or server 150 configured to communicate with one or more locker stations 120.

The microcontroller acts as a servo control mechanism capable of receiving input from a vendor devices 142 and 144, customer device 131 or server 150, analyzing the input from server 150, and generating an output signal to the mechanical systems such as opening or closing the individual lockers. The microcontroller may have an on-board memory to control the power that is applied to the mechanical systems. The microcontroller may receive signals from the power system such as whether any of the components in the various systems need to be replaced or if the objective is accomplished. For instance, a control system may communicate with the microcontroller to unlock and lock the locker locks such that one or more lockers may be selectively opened by the control system. The locks may be in a normally locked position. The locker doors may be coupled to the locker station, such that when the lock is released, the door is configured to open. The door may be motorized, or spring-loaded to bias the door in an open position. The lock may be configured to automatically engage whenever the door is returned to the closed position. The lock may be electronically or mechanically controlled.

Locker station 120 may be near or connected to a remote kiosk such as kiosk 160 with similar features and components to customer device 130 or vendor devices 142 and 144 to present information and receive input from the user 131 or the establishment through a virtual keyboard, touchscreen, or other method known by those of ordinary skill in the art in case the user does not have access to the customer device 130. In one or more embodiments, locker station 120 may include one or more light-emission devices such as a liquid crystal display (LCD) screen for generating an interactive display to the user 131 and the vendor 140. LCD screens may display the user's 131 name when an order has been processed and the goods have been stored in the respective locker, as well as advertisements for goods of the establishment.

Locker station 120 may include a scanner such as a scanner 124 capable of detecting and decoding QR codes presented by customer 131 or user 141. Scanner 124 may include an optical or LED reader capable of reading quick response (QR) codes, as well as NFC and radio frequency (RFID) tags. The QR code scanner is where the customer will scan their mobile phones QR code. Locker station 120 may communicate with other devices via communication links, such as USB (Universal Serial Bus) or HDMI/VGA (High-Definition Multimedia Interface/Video Graphics Array). Locker station 120 also may include local wireless circuitry, which may enable short-range communication to another device. The local wireless circuitry could communicate on any wireless protocol, such as infrared, Bluetooth, IEEE 902.11, or some other local wireless communication protocol.

Locker station 120 may include an output device, such as an alarm speaker, for indicating whether locker station 120 has been tampered with. Locker station 120 may transmit a signal through the communication to server 150 whereby server 150 transmits to the customer device 130 or personal email that their goods have been stored in locker station 120. Locker station 120 may have a communication system so that locker station 120 may communicate with other system components, such as server 150, customer device 130, and the vendor devices, connected to the network 161. Also, the vendor 140 may remotely control all the features of locker station 120 remotely and receive notifications on activity about locker station 120.

The power system of locker station 120 provides the energy to power the mechanical systems, the circuits, and components of the control system during the process of delivery and retrieving goods from the lockers. The locker station 120 may be powered by methods known by those of ordinary skill in the art. In some embodiments, the locker station 120 may plug into an electrical outlet using an electrical cord to supply power to the motor, sensor system, and control system, Further, locker station 120 may include a rechargeable battery pack mounted inside of the housing whereby the reachable battery is of charge, design, and capacity to provide sufficient power to while operating for a set period of time needed for the delivery and retrieval of goods.

Locker station 120 may connect to a power source such as an outlet by a power cord. Locker station 120 may also connect to a charging station capable of recharging the rechargeable battery pack mounted inside of the housing. In other embodiments, the connection may be a wireless charger, which transfers energy from a charger to locker station 120.

The sensor system may include a plurality of detectors mounted to the housing of locker station 120 in the form of standard infrared ("IR") detectors having photodiode and related amplification and detection circuitry. In other embodiments, radio frequencies, magnetic fields, and ultrasonic sensors and transducers may be employed. The detectors may be arranged in any number of configurations and arrangements. For example, locker station 120 may include an omnidirectional detector mounted to the top and bottom of an individual locker to detect signals from a 360-degree field of view. In other embodiments, various detectors may be mounted on the side of lockers which may be used to form a collective field of view.

The sensor system may determine whether a given locker is occupied by goods, whether the locker door is currently open or closed, capturing images, or detecting motion of the customer 131 or the user 141. The sensors may be used for example to detect the presence of the customer 131 wherein the locker station may wake from an energy-saving mode, etc. For example, the sensor is a proximity sensor that senses the proximity of a user to the locker station.

The sensor system may be used to detect the presence of a good or item within a locker such that the locker may be used when not in use and kept secure or unavailable for additional goods or to be accessed for other users which the goods are not for. The sensor system may be used to determine whether a door is open or closed such that a user may be alerted to close a door that was not properly secured after delivering or retrieving goods from the locker.

Locker station 120 may have a temperature control system to control the temperature of the individual lockers in an advantageous manner. A control system may send signals to the temperature control system to control temperature for individual lockers according to temperature needed goods and specifies the desired temperature at which the respective product should be stored.

The temperature control system may be connected to one or more temperature sensors to calculate the actual temperature value of a respective locker wherein temperature control system may regulate the temperature control of predetermined temperature setpoint which is calculated from the identification of goods being stored or by information stored on server databases uploaded by the vendor 140 or preestablished in existing third-party databases. The locker station 120 may have a cooling system wherein circulating fluid is provided by a compression refrigerating machine having a compressor, a condenser and a throttle wherein circulated fluid is transported in a cooled state to the lockers wherein the interior region of the respective locker is cooled by conduction or convention. Locker station 120 may have a heating system, wherein the heating system may have one or more current-carrying coils, band heaters, heater resistors or a water heater. In one embodiment, a locker in a locker station may provide both cooling and heating.

Locker station 120 may also comprise a database or may be remotely stored databases of server 150 wherein data about the goods by vendor 140 to user 131 or locker, including but not limited to the pick-up date and time, duration of storage, vendor 140 personnel, size and weight of the goods, locker used or tracking history.

The following is an exemplary scenario illustrating the above described exemplary system and method for using system 100 and the various components described above. Jane is leaving her kids soccer practice and is planning to grab food on the way home for herself and her family. Jane decides to place an online order for pick-up with the establishment "Burger Blast" using her smartphone at another location. She places an order for three cheeseburgers and fries. Jane checks out and puts in the necessary payment using her credit card with "Burger Blast" to complete her online pick-up order.

Burger Blast personnel, John receives a notification on the "Burger Blast" workstation tablet for Jane. John makes the order for Jane and uses the locker system to place the prepared order inside the locker. Once John puts the order inside of the locker and marks the order as complete, Jane will receive a SMS or personal email with a QR code. Jane walks into Burger Blast and goes to the locker station to scan her QR code at the scanner.

One or more components included in FIG. 1, such as, without limitation, customer device 130, vendor devices 142 and 144, server 150, network 161, may be included in an exemplary method for implementing the system 100. Further, one or more exemplary method steps may be performed by the system 100 including server 150, customer device 130, and vendor devices 142 and 144, which may be interconnected via network 161.

The vendor 140 may initially register to become a registered establishment associated with the system 100, such that its goods may be available to users (e.g., customer 131) to order either on-site or remotely either for themselves. Upon initially signing up with the system 100, vendor 140 may be prompted to provide information along with a requested password. Information may be the hours, directions, promotional content, contact information, corporate structure, and reservations of vendor 140. When registering with the system 100, vendor 140 may also be able to log into a goods retrieval system application using login credentials from other social networking platforms, such as, for example, logging in with a Facebook® Business profile.

The vendor 140 may select and purchase one or more locker stations 120, which may be delivered by an administrator, worker of the system 100, or a third party wherein the locker station may be installed at or near the vendor 140. The locker station 120 may come in many different shapes and sizes and may be selected in any dimensional configuration including different combinations of individually sized lockers and height and width restrictions. Locker station 120 may be installed and connected to a power supply and then to network 161 by any method known by those of ordinary skill in the art. An order fulfillment interface may provide information and options for vendor 140 to input relevant information associated with its goods, including, without limitations, images related to goods, available selections, quantity, and/or promotional material that may be viewed by the customer 131. In other embodiments, a developer or designer may input a unique vendor 140 profile into a server database for connecting with user 131 and receiving order information.

Selections such as goods and services may be uploaded from vendor devices 142 and/or 144 by staff or employees of the vendor 140 to database 154. An updated list of selections provided by vendor 140 may be inputted manually through an order fulfillment interface by staff or employees to database 154 or vendor devices 142 and/or 144 may connect to an available establishment inventory system to provide information about available goods and or services selections. For example, if vendor 140 provides food and wants to include relevant portions or all of its menu, vendor 140 may include selections currently available based on the time of day (such as food only available during brunch and food only available during dinner) among other inputs such as current product inventory to assure that all the necessary ingredients are available before allowing it to be uploaded to the menu. In some embodiments, if goods are available but not a specific ingredient (such as a tomato in a cheeseburger) the goods or services may still be uploaded to the menu, however, the unavailable component would not be included in the list of possible choices.

The customer 131 may initiate a session over network 161 with customer device 130. The session may be initially started by customer 131 launching and a running goods retrieval system application on customer device 130 installed by customer 131 through a manufacturer prescribed process such as downloading goods retrieval system application from an application store or goods retrieval system application.

Server 150 may access a user profile for the vendor 140. In one embodiment, the user profile may reside in database 152, which may be accessed and referenced using an identifier provided by vendor 140 as part of the registration process or login process such as an account name and password.

When customer 131 initially registers to become a registered user of a goods retrieval system application, the customer 131 may be prompted to provide some personal information along with a requested account name and password, such as, without limitation, his or her name, age (e.g., birth date), gender, interests, contact information, home town, address, preferences of food and favorites establishments. In some embodiments, when registering a user account, a goods retrieval system application may allow customer 131 to access and interact with the goods retrieval system application using login credentials from other social networking platforms. For example, in some embodiments, it may be useful and convenient for users of a goods retrieval system application to be able to log in using credentials or sign-in information from another social media application, such as Facebook® or Instagram®. This is advantageous for users who do not wish to have to learn or provide multiple login information.

The customer 131 may couple, link, or connect with user accounts from social networking websites and internal networks. Examples of social networking websites include but are not limited to Instagram®, Facebook®, LinkedIn®, Snapchat®, and Twitter®. The server 150 may use access tokens or other methods as a parameter for searching for a friend list or address book of customer 131 on a social networking site or other site. The server 150 then may use this friend list information to initialize a contact list database for customers stored within the server databases.

The user profile for customer 131 may be associated with a vendor's membership system such as a loyalty program account. A loyalty program account may provide various points and benefits that translate to savings and other desirable incentives for a user that is part of the loyalty program account.

Customer 131 may then search for a specific vendor 140 using a name or category to locate establishment. For example, a search request having a character string may be entered whereby one or more establishments may be identified using name, type of goods provided, or other metadata. For example, if customer 131 wants to locate a nearby burger spot for ordering its goods associated with a goods retrieval system application, the customer 131 may type "burger" with a search request through user interface 132. The server 150 may access a server database and return a list of nearby burger spots. In another example, if customer 131 wants to locate a restaurant named "Blast" for ordering its offered goods associated with a goods retrieval system application, the customer 131 can type "Blast" with a search request through user interface 132. Accordingly, a list of nearby restaurants named "Blast" may be provided to the user in response to his or her search.

The customer 131 may input additional text or changes to the existing search request through user interface 132 to receive an updated list of establishments based on the newly entered text. The search request may also include other parameters, such as categories, price, distance, already visited establishments, and/or establishment hours. Further, in some embodiments, these parameters as well as others may be automatically factored in when a search request is conducted. User interface 132 may provide the ability to adjust and select parameters that may be used to filter and/or rank the results of the establishments displayed to the customer 131.

In other embodiments, the customer 131 may input zip codes, city, county, state names, landmarks or other important locations through the user interface 132 to identify the geographical location in proximity to vendor 140. User interface 132 may display all available vendors registered and stored within server 150 that are in the general area or in near proximity to the customer's geographic location. In one or more embodiments, vendors may be displayed on a map. The map may be displayed to customer 131 with vendors displayed as markers, pins, or identifiers at their respective geographic locations.

Vendors may also be displayed through a list or a drop-down menu from which a user (such as customer 131) may be able to select. Accordingly, customer 131 may select the establishment where customer 131 wishes to receive goods from. In some embodiments, the closest vendor 140 in proximity to the customer's geographic location may be displayed. User interface 132 may selectively enable location tracking while a goods retrieval system application is running or even as long as the customer device 130 is powered on.

Customer 131 may then begin to browse and select goods provided as possible selections that are associated with the establishment's profile that may be stored in a server database as well as view one or more favorites already selected by customer 131. These selections may be displayed through a list or a drop-down menu on user interface 132 of the customer's goods retrieval system application located on the customer device 130.

To place an order, customer 131 may select a particular set of goods and or services either for him or her or for another user. Selections may have nested hyperlinks for linking and to provide additional details to learn about the goods or services. For example, an available menu of choices may have a selection for smoothies with a list of the different smoothies such as strawberry, mango, avocado, banana, peanut butter, with a picture and price next to the name. By selecting the name, picture or price, the menu would provide additional information on that selection including a larger image with details.

Menu assortment may be simplified to facilitate the selection of goods and services by filtering options provided through user interface 132. The selected filter category may cause the menu list to only display selections from the selected category, such as only drinks or gluten-free foods. Optionally, a vendor's operators may choose to define promotional items that can be displayed at the top of the menu. Further, previous selections chosen by customer 131 may be retained in the server database and displayed at the top of the menu. In some embodiments, menu options may be displayed to customer 131 based upon information collected by server 150 and stored in a server database, such as price range, contact preferences and allergies, and demographics, to intelligently present the menu and provide selections that would be appealing to the user.

User interface 132 may provide customer 131 the option to select if customer 131 wants the order to be processed and delivered immediately or, alternatively, provide the option for customer 131 to select a particular date and time for the order to be made at vendor 140. Accordingly, it may be possible for customer 131 to place an order in advance, in which case the order is placed in a pre-order list until the designated time. The pre-order list may be modified or canceled before the order has been processed.

User interface 132 may provide additional information on the selections to customer 131 such as if they ordered this item in the past and if so, how many times they ordered the item. User interface 132 may enable customer 131 to customize the selection after being selected by providing by a series of lists or drop-down choices from which the customer 131 may select. Fields may also be provided to customer 131 for inputting special instructions regarding user preferences for cooking, seasoning, and allergy information.

Customer 131 may add selections to their order or return to a previous menu to continue to search for other goods. If customer 131 chooses to select a particular set of goods and/or services and to place an order, customer 131 may be returned to the menu to continue the process of selecting other selections. Once one or more selections have been chosen, the selections are placed in a shopping cart and the selections appear in the order list. As selections are added to the order list, a sub-total is calculated.

If satisfied with the order of the shopping cart, customer 131 may proceed to checkout using an appropriate button. If customer 131 is not satisfied, they may cancel one or more specific selections or orders in the order list or modify a selection, returning customer 131 to a previously engaged menu session to alter the selection.

User interface 132 may display to customer 131 the final order summary, the price information including subtotal, discounts and taxes, promotional coupon and gift card entry fields, mode of payment, and calculated total including subtotal combined with taxes and discounts. Customer 131 may input their credit card information for a credit card using any credit card known in the art, including, without limitation an ATM card, a VISA®, MasterCard®, Discover®, or American Express® card in a credit card input field. Customer 131 may submit the payment information via an appropriate button through user interface 132 or return to an earlier step in the session.

User interface 132 may provide the ability to obtain one or more images of the credit card associated with the financial transaction. Images of the credit card may be captured by a camera on customer device 130 wherein a goods retrieval system application may have access to the images. Images may include a front image of the credit card and back image of the credit card. Sever 150 may collect and store pictures of one or more credit cards of each user in a server database for subsequent use. In some embodiments, images and the extracted details of the credit card may be deleted from the memory immediately or shortly after a transaction has been completed or terminated, while in further embodiments temporarily stored credit card data may be encrypted and compressed for added security and stored on a server database for subsequent use whereby user interface 138 may allow customer 131 to select from previously used credit cards.

The server 150 may then receive an order over network 161 initiated by customer 131. The order may indicate the customer 131 sending the order, vendor 140, and one or more selections chosen by customer 131, any message sent by customer 131, and payment information. The payment information is then submitted and confirmed (e.g. by server 150 in one exemplary embodiment) for processing of the payment. While server 150 is processing the payment, the appropriate systems or providers are contacted in order to complete the transaction and payment is transferred from customer 131 to vendor 140. If the payment successfully transfers from customer 131, a confirmation message may be displayed to confirm the time of purchase and the total price charged as well as the approximate time the selections may be redeemed by customer 131. If payment is declined, a failure message may be displayed to the customer 131 notifying customer 131 of the reason for the failed transaction. After the transaction is completed, a digital receipt of payment may be stored in a server profile database.

Server 150 may then transmit the order to vendor 140 for presentation via an order-fulfillment interface to employees in order to fulfill the order. If the vendor 140 has multiple devices, the method may include displaying the order to multiple vendor devices instead of just one or transmitting the order to a specific vendor device of the multiple vendor devices associated with a particular vendor 140 that would be responsible for providing selections on that specific order. Vendor device 142 may have unique identification markers to enable vendor device 142 to be distinguished from one another to decrease confusion.

Server 150 may then verify an order and estimate a time for completing the order by vendor 140. An order fulfillment interface may provide the employee or staff at vendor 140 an option to cancel the order, which is then received by the server 150, whereby server 150 cancels the order and sends a notification to customer 131. An order fulfillment interface may also provide fields for the staff or employee to input the reason for the cancellation, which may be transmitted to server 150 and then to customer device 130 to be displayed to customer 131 through user interface 132 as well as recorded and stored in a server database for subsequent use.

An example for this situation to occur would be if vendor 140 no longer could fulfill the order because they lack the ingredients or because vendor 140 cannot fulfill the order for any other reason (e.g. vendor 140 will be closed when the order needs to be fulfilled). The cancellation message may then be transmitted to and displayed as a message through user interface 132 to customer 131, notifying customer 131 the order has been canceled and that their payment will be returned. The approximate time for completion may be estimate-based, at least in part, on prior pending orders existing at vendor 140 and previous completion times for the exact or similar order. The approximate time of completion and designated pickup point in vendor 140 may be transmitted to server 150 over the network and then transmitted and displayed through user interface 132 to customer 131.

In one embodiment, upon an order of a food item 149, a first preparation time of the order is determined (e.g., 15 minutes) and a second preparation time of current previous orders is determined (e.g., 15 minutes). A first predicted delivery time of delivery is transferred to the locker station 120. The first predicted delivery time is based on the first preparation time and the second preparation time. In one embodiment, the first predicted time is based on historical data of ordered food. For example, if food item A is the ordered food, then historical data on the time to prepare the food item A is used to determine the first predicted time.

The controller 125 may determine that the first predicted delivery time is incorrect based on a factor. The controller 125 may then determine a second predicted delivery time based on the factor. In one embodiment, the second predicted time is determined prior to the food item placed within a locker.

The factor(s) may be any factor that may affect the accuracy of the first predicted delivery time. For example, the factor(s) may be poor weather that negatively affects the commute time of user 141 to the locker station 120 or a time of day (e.g., a heavy commute time) that negatively affects the commute time of the user 141 to the locker station 120.

In one embodiment, a user may use an application on customer device 130 that stores credit card information to pay for an order of food. In some instances, information related to a user (e.g., credit card information, past orders) is stored via the application. Prior to ordering food, the user is authenticated with the system 100. Upon payment of the food, the user may approach the locker station and hold their customer device 130 up to the NFC scanner to unlock the door of a locker such that the user may remove the ordered food from the open locker.

Figure 2:
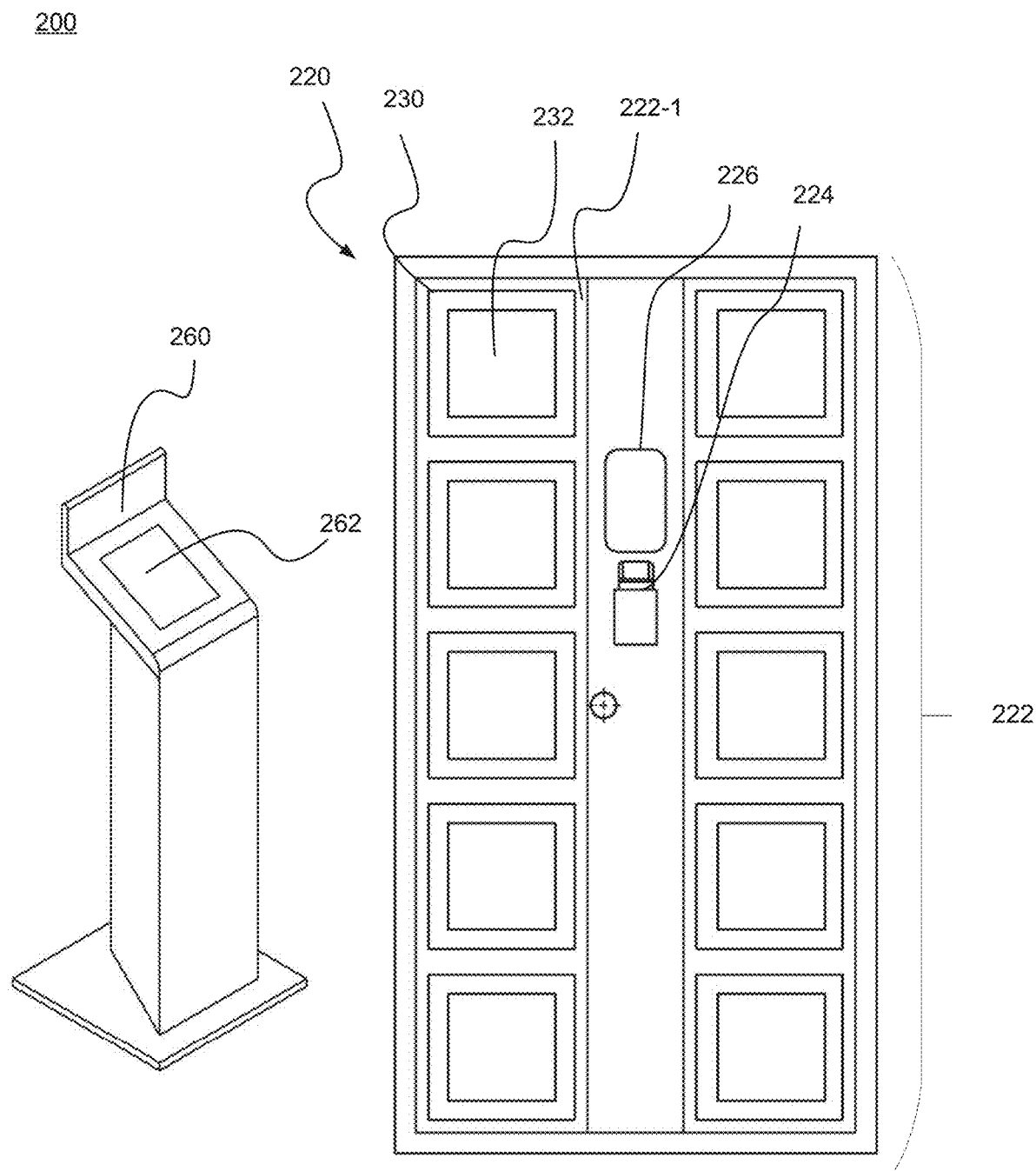
FIG. 2 illustrates a contactless locker system, according to an embodiment.

FIG. 2 illustrates a contactless locker system 200, according to an embodiment. Some of the features in FIG. 2 are the same as or similar to some of the features in FIG. 1 as noted by same and/or similar reference characters, unless expressly described otherwise. Furthermore, the elements and/or features described regarding FIG. 2 may be the same as and/or similar to other similarly named elements and/or features described and/or illustrated throughout this disclosure.

The system 200 includes a locker station 220. The locker station 220 includes a set of laterally adjacent lockers 222. For example, the lockers 222 includes a first locker 222-1.

In one embodiment, the first locker 222-1 includes a front door 230 and a first window (e.g., a transparent or translucent window) such that the contents (or lack of contents) in the first locker 222-1 can be visually determined. In various embodiments, each of the individual lockers in the lockers 222 includes a front door and a window in the door. In various embodiments, each of the lockers includes a back door (opposite the front door), where each back door has a window or does not have a window.

The locker station 220 may include display 226 for displaying instructions to the customer 131. The locker station 220 may include a scanner 224 for scanning a scannable code, such as a QR code, displayed on a customer's mobile device.

The system 200 may include a kiosk 260 that is communicatively coupled to the locker station 220. The kiosk 260 may include a touchscreen 262. The kiosk 260 may allow a user (e.g., customer 131) to manually search for their orders by their name or phone number.

In various embodiments, the kiosk 260 may include similar features and components as customer device 130 and/or vendor devices 142 and 144. For example, the kiosk 260 may be configured to present information to and receiving input from customer 131 or user 141 via a virtual keyboard, touchscreen. In one embodiment, the kiosk 260 is used by the customer 131 when the customer does not have access to the customer device 130. In various embodiments, the kiosk 260 may allow customer 131 and/or user 141 to enter, edit, or retrieve information about recipients, tracking history, goods, availability, maintenance, or other related functions of the system 200.

Figure 3:
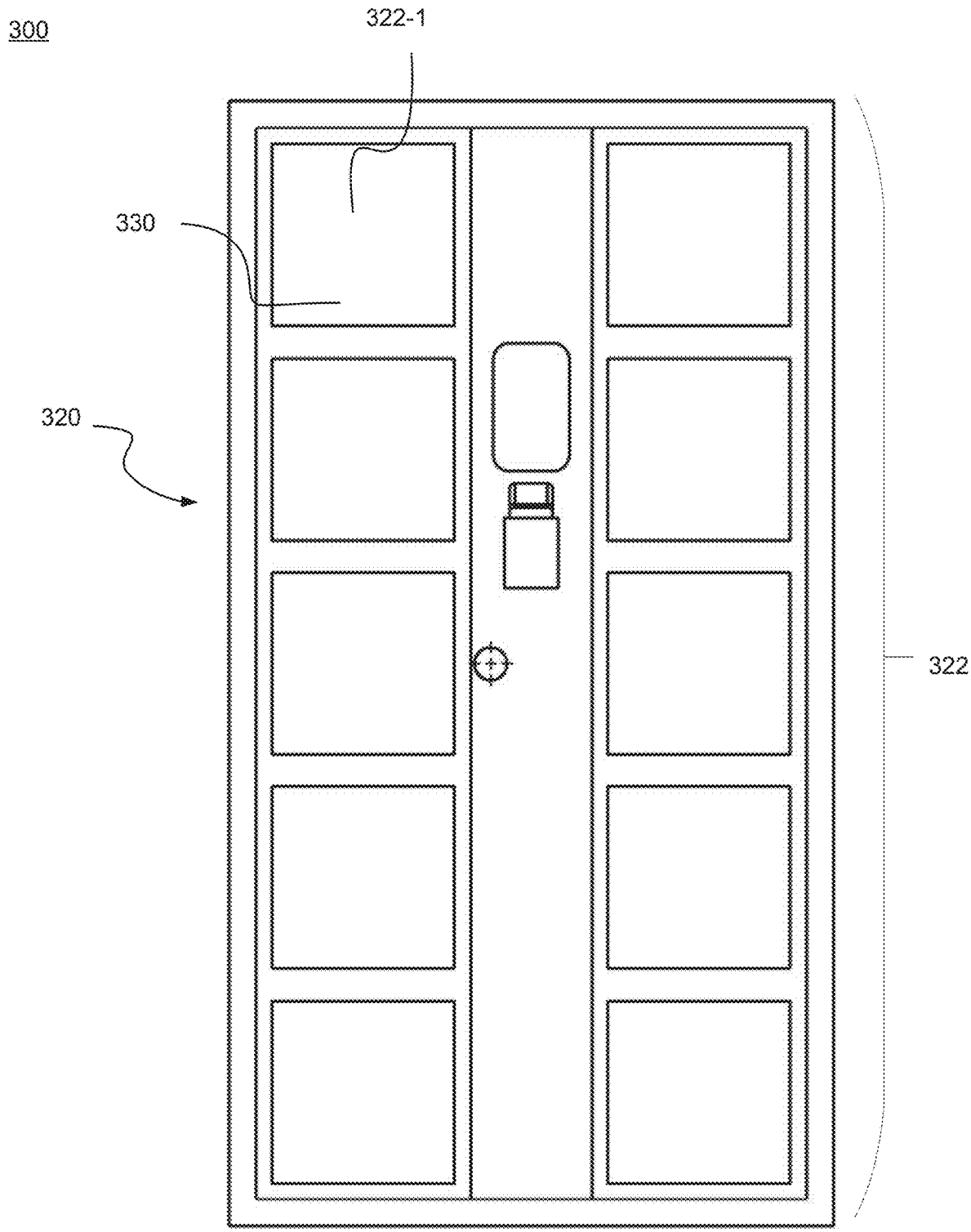
FIG. 3 illustrates a contactless locker system, according to an embodiment.

FIG. 3 illustrates a contactless locker system 300, according to an embodiment. Some of the features in FIG. 3 are the same as or similar to some of the features in FIGS. 1-2 as noted by same and/or similar reference characters, unless expressly described otherwise. Furthermore, the elements and/or features described regarding FIG. 3 may be the same as and/or similar to other similarly named elements and/or features described and/or illustrated throughout this disclosure.

The system 300 includes a locker station 320. The locker station 320 includes a set of laterally adjacent lockers 322. For example, the lockers 322 includes a first locker 322-1.

In one embodiment, the first locker 322-1 includes a front door 230. In various embodiments, each of the individual lockers in the lockers 322 includes a front door. In various embodiments, each of the lockers includes only a front door (and not a back door opposite the front door). In various embodiments, each of the front doors on the respective lockers does not include a front window such that the contents placed within the lockers are not able to be seen by others while the front door is closed.

Figure 4:
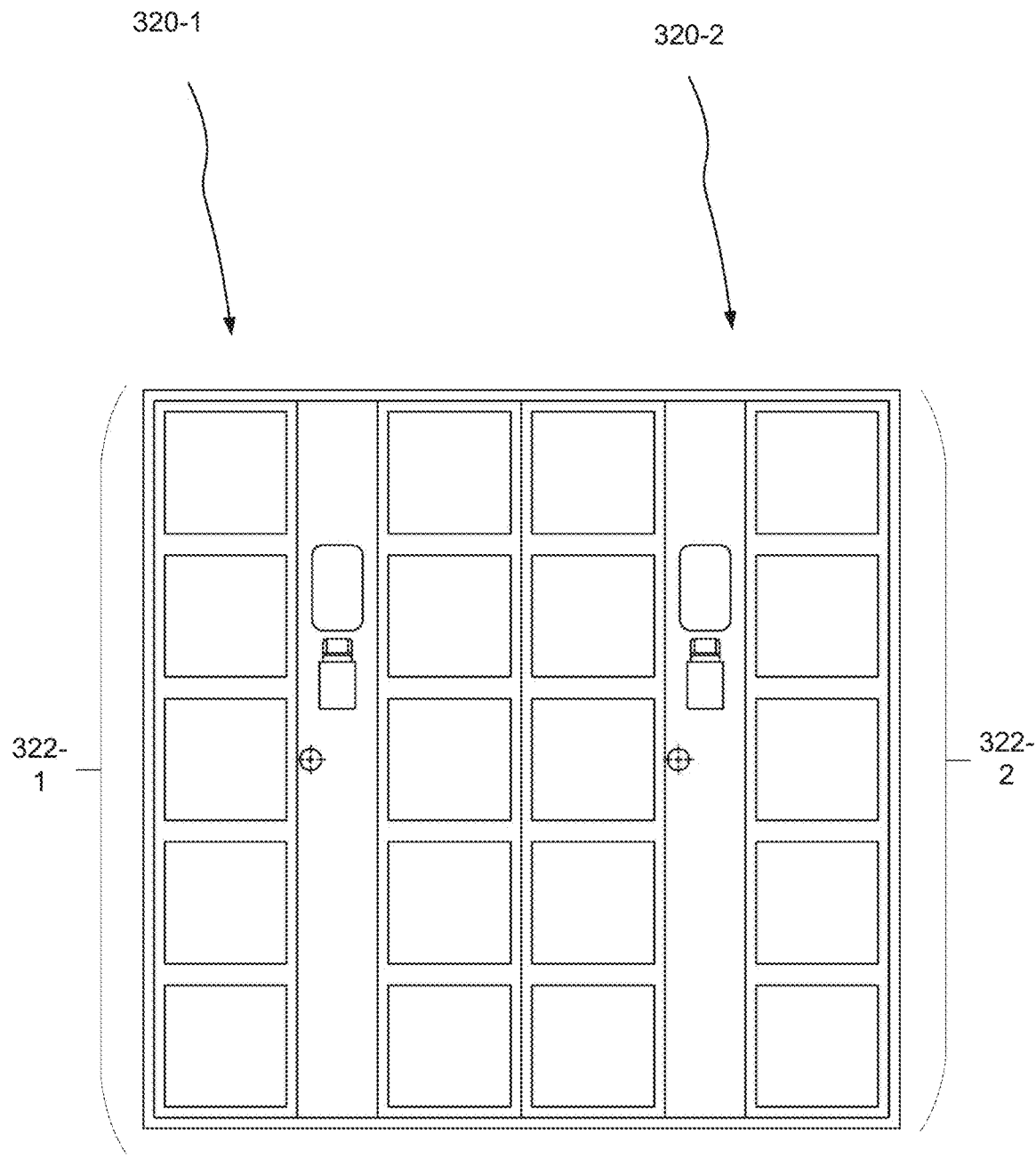
FIG. 4 illustrates a contactless locker system, according to an embodiment.

FIG. 4 illustrates a contactless locker system 400, according to an embodiment. Some of the features in FIG. 4 are the same as or similar to some of the features in FIGS. 1-3 as noted by same and/or similar reference characters, unless expressly described otherwise. Furthermore, the elements and/or features described regarding FIG. 4 may be the same as and/or similar to other similarly named elements and/or features described and/or illustrated throughout this disclosure.

The system 400 includes a first locker station 320-1 that includes a first set of laterally adjacent lockers 322-1 (e.g., ten lockers) and a second locker station 320-2 that includes a second set of laterally adjacent lockers 322-2 (e.g., ten lockers). As such, in one embodiment, the system 400 includes twenty lockers.

In one embodiment, system 400 may include a first locker station, such as the locker station 220 (that includes ten lockers), and a second locker station 220 (that also includes ten lockers). As such, the system 400 would include twenty lockers.

Figure 5A:
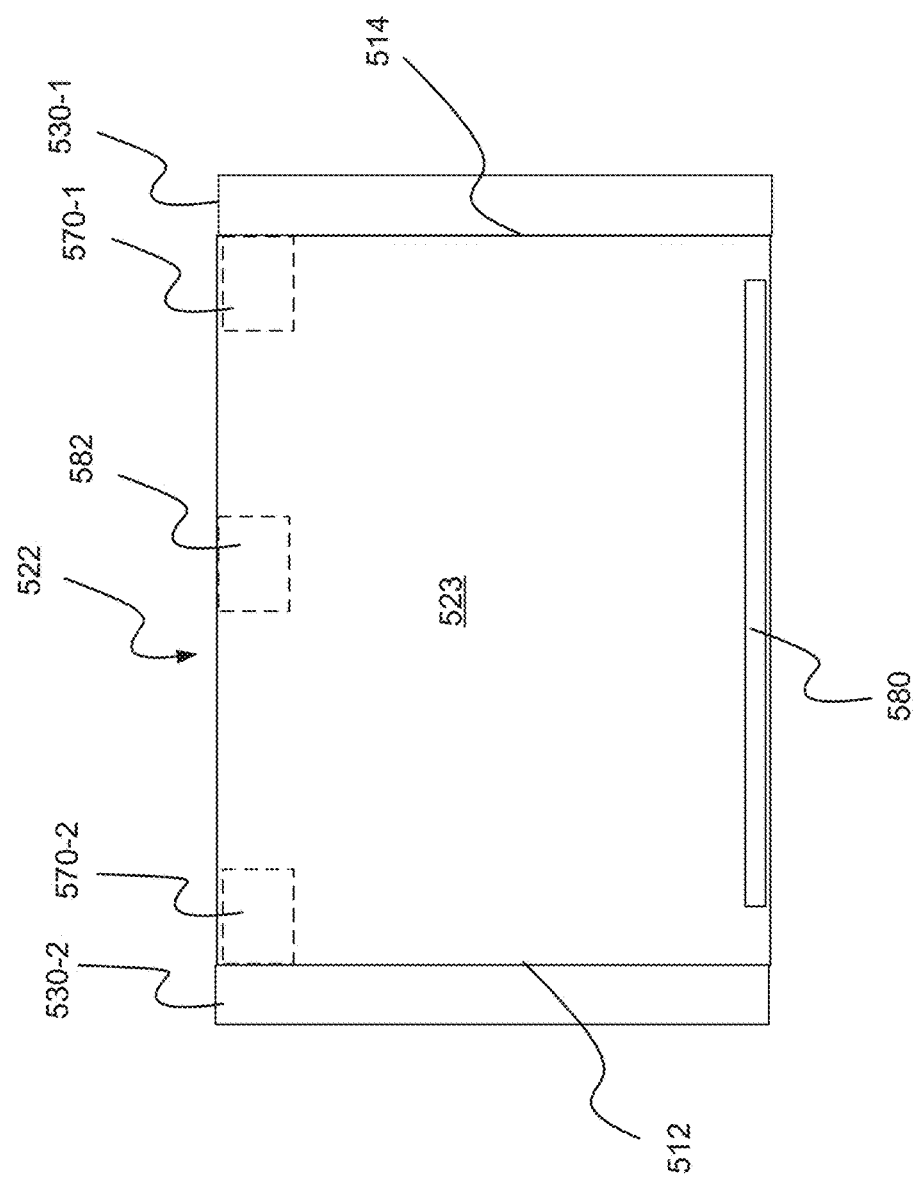
FIG. 5A illustrates a side-view of a locker of a contactless locker system, according to an embodiment.

FIG. 5A illustrates a side-view of a contactless locker 522 in a contactless locker system 500, according to an embodiment. Some of the features in FIG. 5A are the same as or similar to some of the features in FIGS. 1-4 as noted by same and/or similar reference characters, unless expressly described otherwise. Furthermore, the elements and/or features described regarding FIG. 5A may be the same as and/or similar to other similarly named elements and/or features described and/or illustrated throughout this disclosure.

The contactless locker 522, as depicted in FIG. 5A, is in a closed position. The contactless locker 522 includes a first door 530-1 that allows access to an internal space 523 via a front opening 514. The first door 530-1 may include a window and may not include a window.

The locker 522 includes a second door 530-2 that allows access to the internal space 523 via a back opening 512. The second door 530-2 may include a window or may not include a window.

The locker 522 may include a first actuation device 570-1 for automatically opening the first door 530-1. The locker 522 may include a second actuation device 570-2 for automatically opening the second door 530-2. The first actuation device 570-1 or the second actuation device 570-2 may include a motor that rotates the respective door open or may be a motor and a lever arm that rotate the door open or the like. The locker 522 may include a single actuation device for opening/closing both the first door 530-1 and the second door 530-2.

The locker 522 may include a sensor 580 for detecting whether an item is placed in the locker 522. For example, if an item is placed on the sensor within the locker 522, then the sensor generates a signal indicating that an item is placed on the sensor. The sensor 580 may be a pressure sensor, a weight sensor or the like. In various embodiments, the locker 522 includes a sensor (e.g., an image sensor, an electro-mechanical sensor) used to determine whether an item is located within the locker.

The locker 522 may include a camera 582 for detecting whether an item is placed in the locker 522. For example, if an item is placed within the locker, then an image generated by the camera 582 that includes at least a portion of the item indicates that the item is placed within the locker 522.

Figure 5B:
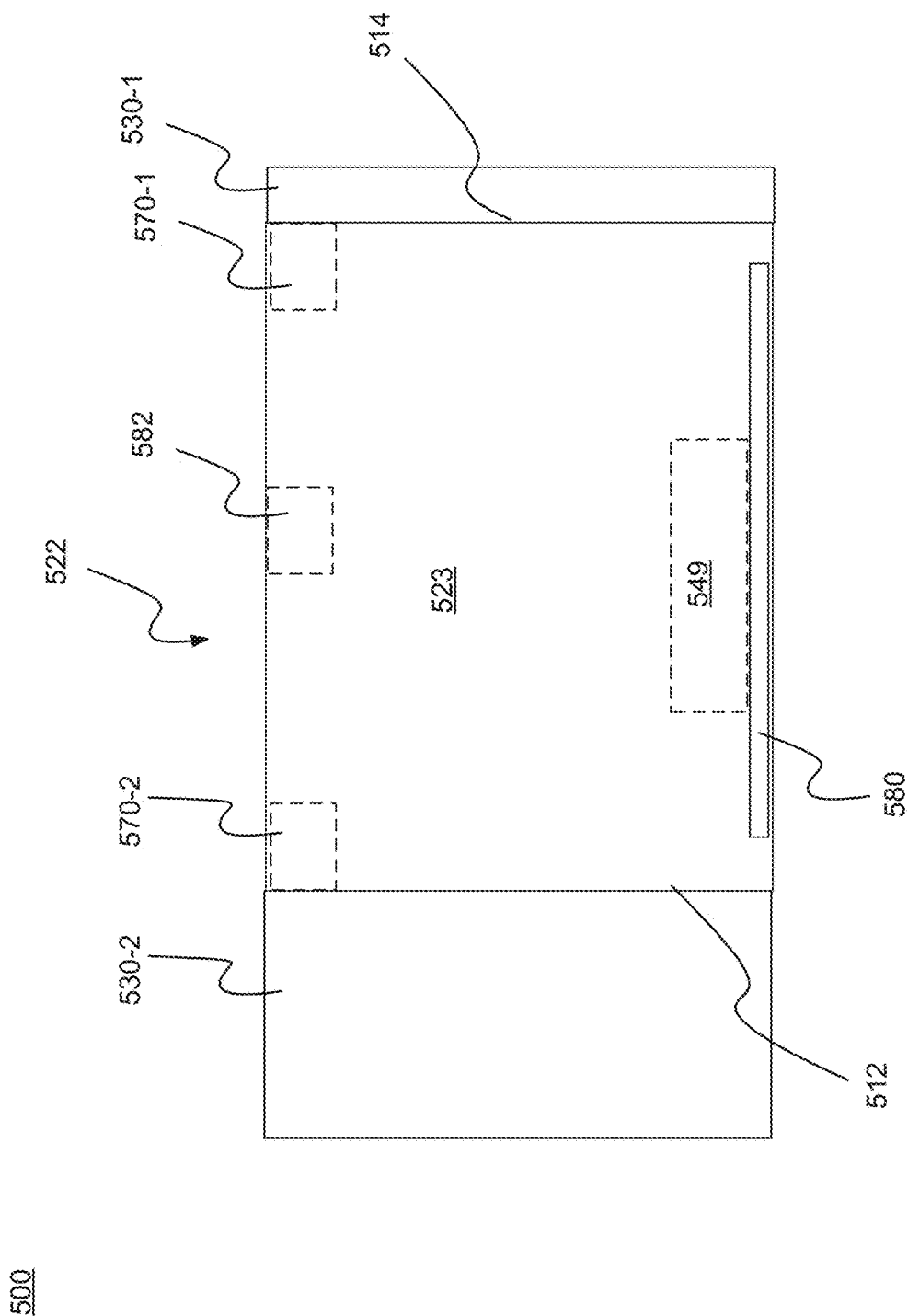
FIG. 5B illustrates a side-view locker of a contactless locker system, according to an embodiment.

FIG. 5B illustrates a side-view of a contactless locker 522 in a contactless locker system 500, according to an embodiment. Some of the features in FIG. 5B are the same as or similar to some of the features in FIGS. 1-5A as noted by same and/or similar reference characters, unless expressly described otherwise. Furthermore, the elements and/or features described regarding FIG. 5B may be the same as and/or similar to other similarly named elements and/or features described and/or illustrated throughout this disclosure.

The contactless locker 522, as depicted in FIG. 5B, is in an open position. For example, the second door 530-2 is open to allow a user to place item 549 (e.g., a food order) into the locker 522.

In one embodiment, the vendor 140 will use vendor device 144 to select the locker door, in which the controller 125 instructs the second actuation device 570-2 to open the second door 530-2. As such, the user is able to place item 549 into the locker 522 via the second opening 512.

In various embodiments, the controller 125 determines that a user has not placed the item 549 into the locker within a predetermined amount of time. If a user has not placed the item 549 within a predetermined amount of time an audible and/or visual alert is emitted to remind the vendor to place the item into the locker.

Figure 5C:
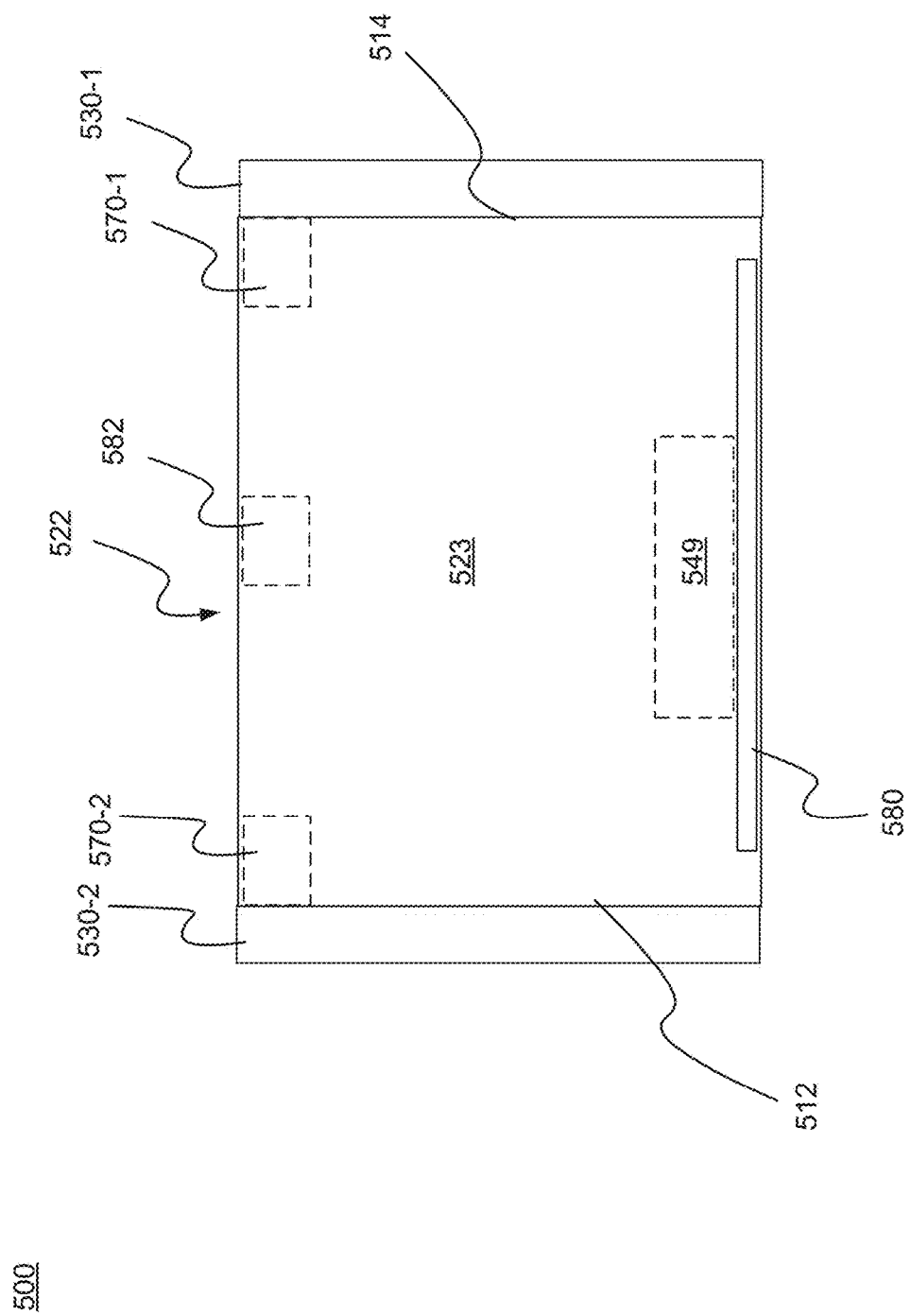
FIG. 5C illustrates a side-view locker of a contactless locker system, according to an embodiment.

FIG. 5C illustrates a side-view of a contactless locker 522 in a contactless locker system 500, according to an embodiment. Some of the features in FIG. 5C are the same as or similar to some of the features in FIGS. 1-5B as noted by same and/or similar reference characters, unless expressly described otherwise. Furthermore, the elements and/or features described regarding FIG. 5B may be the same as and/or similar to other similarly named elements and/or features described and/or illustrated throughout this disclosure.

The contactless locker 522, as depicted in FIG. 5C, is in a closed position. For example, the second door 530-2 is closed to store the item 549 (e.g., a food order) within the locker 522.

Upon the user placing the item 549 into the locker 522, the controller 125 instructs the second actuation device 570-2 to close the second door 530-2. In one example, the sensor 580 generates a pressure signal indicative of the item 549 being placed on the sensor 580. That is, it is determined by a pressure signal generated by sensor 580 that the item 549 is placed in the locker 522. The controller 125, in response to receiving the pressure signal, instructs the second actuation device 570-2 to close the first door 530-2.

FIG. 5D illustrates a side-view of a contactless locker 522 in a contactless locker system 500, according to an embodiment. Some of the features in FIG. 5D are the same as or similar to some of the features in FIGS. 1-5C as noted by same and/or similar reference characters, unless expressly described otherwise. Furthermore, the elements and/or features described regarding FIG. 5D may be the same as and/or similar to other similarly named elements and/or features described and/or illustrated throughout this disclosure.

The contactless locker 522, as depicted in FIG. 5D, is in an open position. For example, the first door 530-1 is open to allow a user to retrieve the item 549 (e.g., a food order) from the locker 522.

In one embodiment, in response to a QR code displayed on a customer device 130 by a scanner 124, the controller 125 instructs the first actuation device 570-1 to open the first door 530-1. As such, the customer 131 is able to retrieve the item 549 from the locker 522 via the first opening 514.

Upon the customer 131 retrieving the item 549 from the locker 522, the controller 125 instructs the first actuation device 570-1 to close the first door 530-1. In one example, the sensor 580 generates a pressure signal indicative of the item 549 removed from the sensor 580. That is, it is determined by a pressure signal generated by sensor 580 that the item 549 is removed from the locker 522. The controller 125, in response to receiving the pressure signal, instructs the first actuation device 570-1 to close the first door 530-1.

In various embodiments, the controller 125 determines that a user has not removed the item 549 within a predetermined amount of time. If a user has not removed the item 549 within a predetermined amount of time an audible and/or visual alert is emitted to remind the customer to remove the item from the locker.

Figure 6:
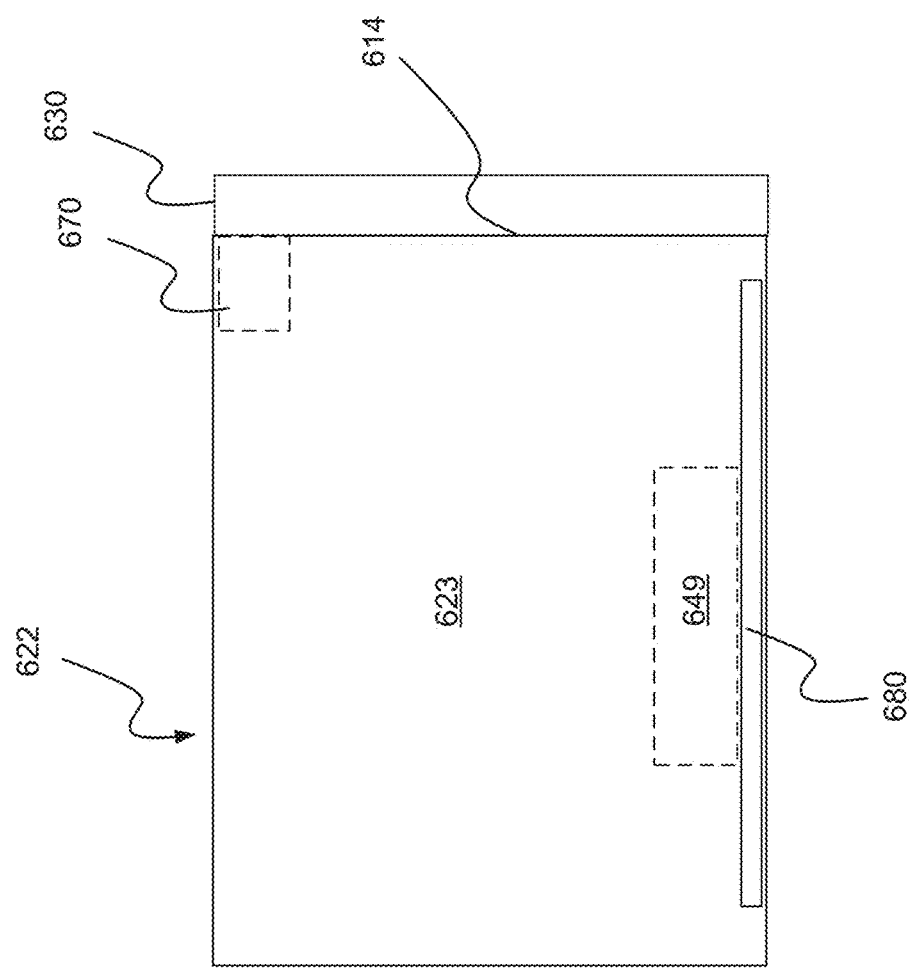
FIG. 6 illustrates a side-view locker of a contactless locker system, according to an embodiment.

FIG. 6 illustrates a side-view of a contactless locker 622 in a contactless locker system 600, according to an embodiment. Some of the features in FIG. 6 are the same as or similar to some of the features in FIGS. 1-5D as noted by same and/or similar reference characters, unless expressly described otherwise. Furthermore, the elements and/or features described regarding FIG. 6 may be the same as and/or similar to other similarly named elements and/or features described and/or illustrated throughout this disclosure.

The contactless locker 622, as depicted in FIG. 6, is in a closed position. For example, the door 630 is closed to store the item 649 (e.g., a food order) within the locker 622.

In one embodiment, the vendor 140 will use vendor device 144 to select the locker door, in which the controller 125 instructs the actuation device 670 to open the door 630. As such, the user is able to place item 649 into the locker 622 via the second opening 614.

In one embodiment, upon the user placing the item 649 into the locker 622, the controller 125 instructs the actuation device 570 to close the door 630. In one example, the sensor 680 generates a pressure signal indicative of the item 649 being placed on the sensor 680. The controller 125, in response to receiving the pressure signal, instructs the actuation device 570 to close the door 530.

In one embodiment, upon the customer 131 retrieving the item 649 from the locker 622, the controller 125 instructs the actuation device 670 to close the door 630. In one example, the sensor 680 generates a pressure signal indicative of the item 649 is removed from the locker 622. The controller 125, in response to receiving the pressure signal, instructs the actuation device 670 to close the door 630. In one embodiment, the locker 622 only includes a single door 630. As such, the door 630 is the only door to allow ingress and egress to the locker 622.

Figure 7:
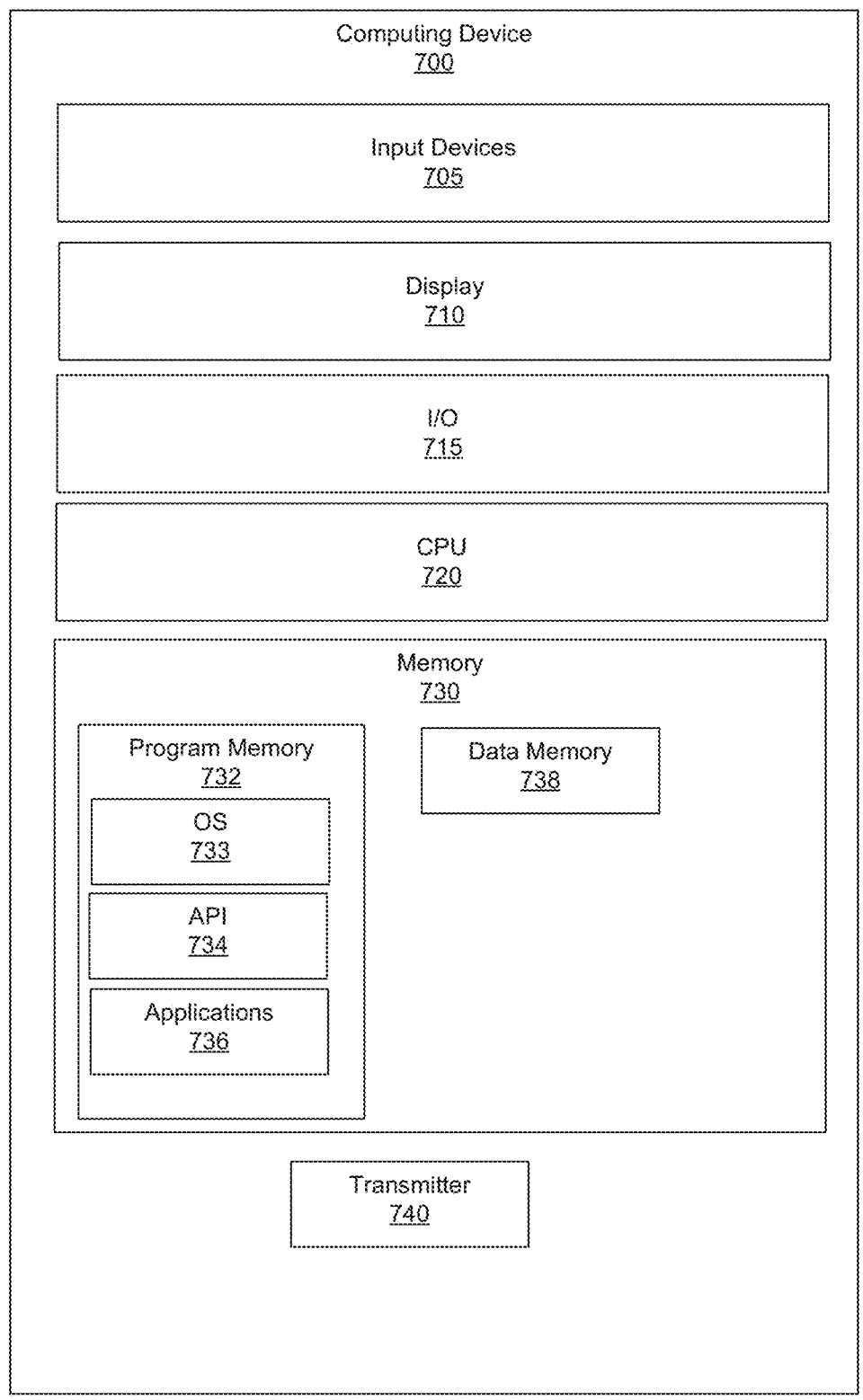
FIG. 7 illustrates a computing device in a contactless locker system, according to an embodiment.

FIG. 7 illustrates a block diagram of a computing device 700 in a contactless locker system, according to an embodiment. Some of the features in FIG. 7 are the same as or similar to some of the features in FIGS. 1-6 as noted by same and/or similar reference characters, unless expressly described otherwise. Furthermore, the elements and/or features described regarding FIG. 7 may be the same as and/or similar to other similarly named elements and/or features described and/or illustrated throughout this disclosure.

The computing device 700, in various embodiments, may be customer device 130, vendor device 142 and/or vendor device 142.

The computing device 700 may comprise a housing for containing one or more hardware components that allow access to edit and query contactless locker system 100. The computing device 700 may include one or more input devices such as input devices 705 that provide input to a CPU (processor) such as CPU 720 of actions related to the customer 131. The input devices 705 may be implemented as a keyboard, a touchscreen, QR code reader, wearable input device, a camera, a fingerprint reader and combinations thereof.

The actions may be initiated by a hardware controller that interprets the signals received from input device 705 and communicates the information to CPU 720 using a communication protocol. The CPU 720 may be a single processing unit or multiple processing units in a device or distributed across multiple devices. CPU 720 may be coupled to other hardware devices, such as one or more memory devices with the use of a bus, such as a PCI bus or SCSI bus. The CPU 720 may communicate with a hardware controller for devices, such as for a display 710. The display 710 may be used to display text and graphics. In some examples, the display 710 provides graphical and textual visual feedback to a user.

In one or more embodiments, the display 710 may include an input device 705 as part of display 710, such as when input device 705 is a touchscreen. In some implementations, display 710 is separate from input device 705. Examples of display 710 include but are not limited to: an LCD display screen and an LED display screen. The display 710 may also comprise a touch screen interface operable to detect and receive touch input such as a tap or a swiping gesture. Other I/O devices such as I/O devices 715 may also be coupled to the processor, such as a network card, video card, audio card, USB, FireWire or other external devices, camera, printer, speakers. In further embodiments, a display may be used as an output device, such as, but not limited to, a computer monitor, a smart device, a printer, or combinations thereof.

The CPU 720 may have access to a memory such as memory 730. Memory 730 may include one or more of various hardware devices for volatile and non-volatile storage and may include both read-only and writable memory.

For example, memory 730 may comprise random access memory (RAM), CPU registers, read-only memory (ROM), and writable non-volatile memory, such as flash memory and hard drives. Memory 730 may be a non-transitory memory.

Memory 730 may include program memory such as program memory 732 capable of storing programs and software, including an operating system, such as operating system 733. Memory 730 may further include an application programming interface (API), such as API 286, and other computerized programs or application programs such as application programs 736.

Memory 730 may also include data memory such as data memory 738 that may include database query results, configuration data, settings, user options, user preferences, or other types of data, which may be provided to program memory 732 or any element of the customer device 130.

The computing device 700, may in some embodiments, be a computing device such as a merchant terminal device, dedicated register device, iPhone™, Android-based phone, or Windows-based phone, a tablet, desktop computer, laptop computer, or any computing device capable of executing instructions with sufficient processor power and memory capacity to perform operations of system 100 while in communication with network 161. The computing device 700 may have location tracking capabilities such as Mobile Location Determination System (MLDS) or Global Positioning System (GPS) whereby they may include one or more satellite radios capable of determining the geographical location of the user's computing device.

The computing device 700 may have a transmitter 740, to transmit data. Transmitter 740 may have a wired or wireless connection and may comprise a multi-band cellular transmitter to connect to the server 150 over 2G/3G/4G/5G cellular networks. Other embodiments may also utilize Near Field Communication (NFC), Bluetooth, or another method to communicate information.

In various embodiments, the server 150 may receive one or more orders initiated by user 131 via user interface 132 on a goods retrieval system API 734 running on customer device 130. After receiving the order from the customer device 130, the order may be transmitted (e.g. via server(s) 150) to vendor device 142 (and/or vendor device 144). The vendor devices may display the order through an order-fulfillment interface whereby an employee, member, or staff may then carry out the order or delegate the order to the one responsible for carrying out a task such as the specific employee needed to fulfill the order.

One or more menu selections and cancellation requests initiated via the vendor 140 on the order-fulfillment interface may be displayed on the vendor devices. In one embodiment, a verification PIN, QR code, validation or authentication information may be presented through user interface 132 to user 131 who may then redeem the order after the vendor 140 has completed the order for user 131.

Figure 8:
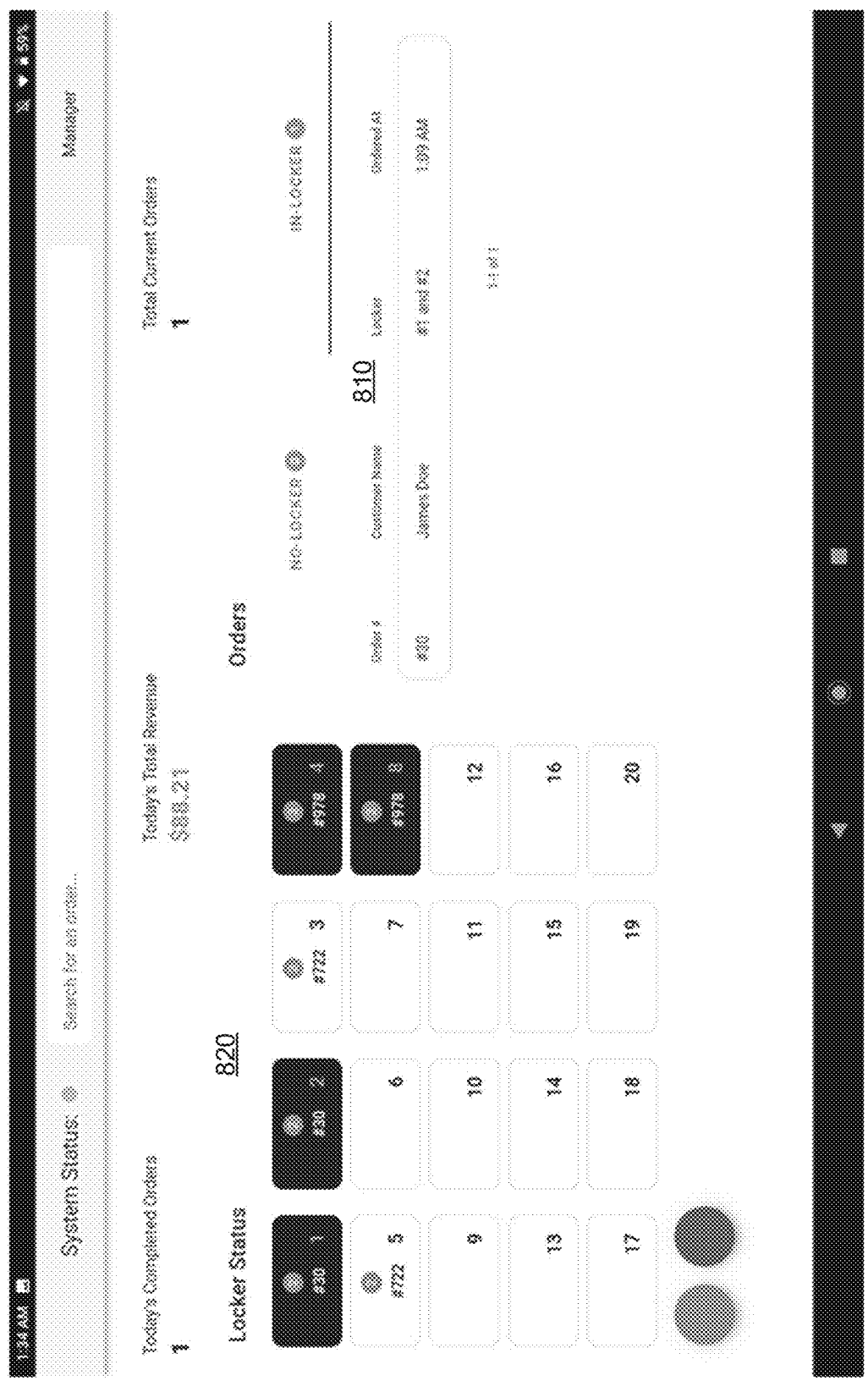
FIG. 8 illustrates a user interface in a contactless locker system, according to an embodiment.

FIG. 8 illustrates a user interface 800 displayed in a contactless locker system, according to an embodiment. Some of the features in FIG. 8 are the same as or similar to some of the features in FIGS. 1-7 as noted by same and/or similar reference characters, unless expressly described otherwise. Furthermore, the elements and/or features described regarding FIG. 8 may be the same as and/or similar to other similarly named elements and/or features described and/or illustrated throughout this disclosure.

User 141 (e.g., personnel of vendor 140) will use the vendor device 144 to control the placement of the orders and control the locker system. Vendor device 141 will presented with the user interface 800 that includes a list of customers 810 and a list of lockers 820 in the locker station. The user 141 may select a customer's name and select an available locker which may be visually indicated by the system to show which lockers are available.

Locker station 120 then verifies the QR code, PIN, or name based on transactions stored on a server database. If the QR code, PIN or name is not found, then locker station 120 may provide an error message and request reentry of the information. If the QR code, PIN or name is found, then locker station 120 may proceed and permit access to a locker and/or receive additional information from the customer 131.

Based on the specific goods for the customer 131, locker station 120 may provide access to a particular locker based on size of goods or optimal temperature needed for goods based on data stored in a server database wherein locker station 120 provides cooling and/or heating to the locker. If the customer 131 requires accommodations (ADA), during registration, customer 131 may select the box, during registering or ordering, for good to be delivered to a bottom row wherein a locker in that row may be provided access.

If the proper QR code, PIN or name is entered, locker station 120 sends a command to activate the mechanical system that opens the locker door of the locker in which the goods will be stored. In some embodiments, user 141 places goods inside a locker and closes the door. Locker station 120 sends a command to activate the mechanical system that secures the locker door of the locker for which the goods are stored wherein it can only be opened by establishment or customer 131 with QR code, PIN or name. After the locker door is secured, the LCD monitor on the locker may transition to a logo screen having the customer 131 name on the screen for the user to quickly identify where their goods are.

The customer 131 may then arrive at a designated pickup point and receive the completed order by scanning an access code such as a QR code, an RFID tag, or other suitable identification technology displayed on user interface 132 at locker station 120.

Figure 9:
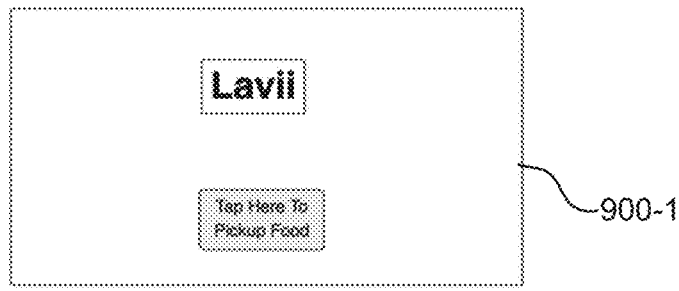
FIG. 9 illustrates a user interface in a contactless locker system, according to an embodiment.
Figure 9:
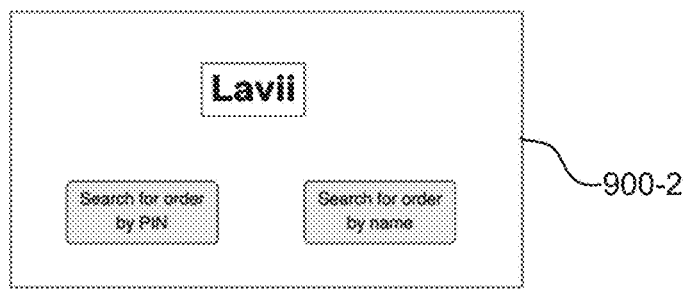
Figure 9:
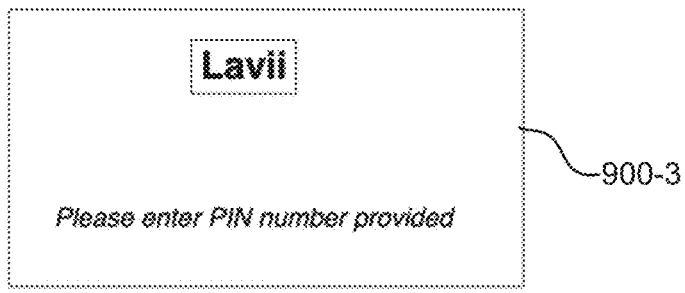
Figure 9:
Figure 9:

FIG. 9 illustrates a user interface 900 displayed in a contactless locker system, according to an embodiment. Some of the features in FIG. 9 are the same as or similar to some of the features in FIGS. 1-8 as noted by same and/or similar reference characters, unless expressly described otherwise. Furthermore, the elements and/or features described regarding FIG. 9 may be the same as and/or similar to other similarly named elements and/or features described and/or illustrated throughout this disclosure.

In one embodiment, the user interface (or UI) 900 is associated with a kiosk phone number and name look-up process. As such, the user interface 900 may be displayed at a kiosk. The UI 900-1 is initially displayed. The UI 900-2 allows a user to select to search for an order by an identifier, such as a PIN, a phone number, and/or name or the name of the customer. In response to the user selecting to search for an order via the identifier, the UI 900-3 prompts a user to enter the identifier. The UI 900-4 prompts a user to confirm or decline a pickup. The UI 900-5 confirms an order and instructs a user to allow the associated locker to open.

Figure 10:
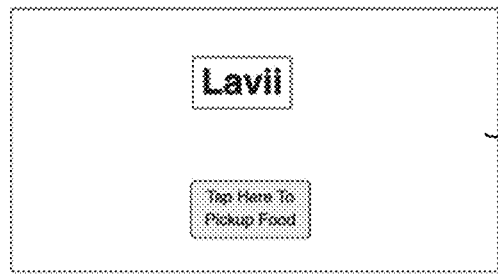
FIG. 10 illustrates a user interface in a contactless locker system, according to an embodiment.
Figure 10:
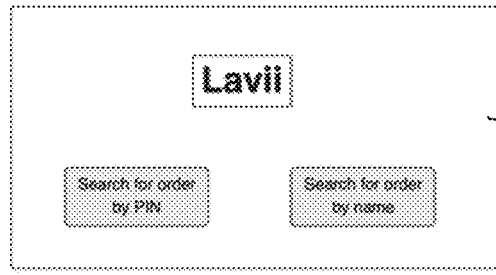
Figure 10:
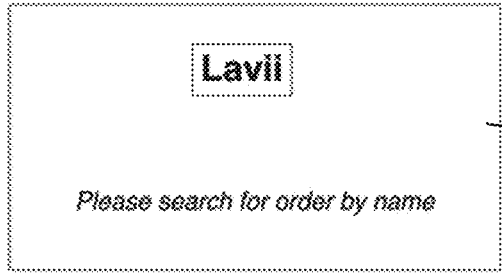
Figure 10:
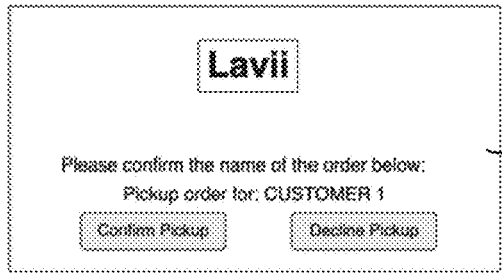
Figure 10:

FIG. 10 illustrates a user interface 1000 displayed in a contactless locker system, according to an embodiment. Some of the features in FIG. 10 are the same as or similar to some of the features in FIGS. 1-9 as noted by same and/or similar reference characters, unless expressly described otherwise. Furthermore, the elements and/or features described regarding FIG. 10 may be the same as and/or similar to other similarly named elements and/or features described and/or illustrated throughout this disclosure.

In one embodiment, the user interface (or UI) 1000 is associated with a name look-up process at a kiosk. As such, the user interface 1000 may be displayed at a kiosk. The UI 1000-1 is initially displayed. The UI 1000-2 allows a user to select to search for an order by name or the name of the customer. In response to a user selecting to search for an order via a customer name, the UI 1000-3 prompts a user to enter their name. The UI 1000-4 prompts a user to confirm or decline a pickup. The UI 1000-5 confirms an order and instructs a user to allow the associated locker to open.

Figure 11:
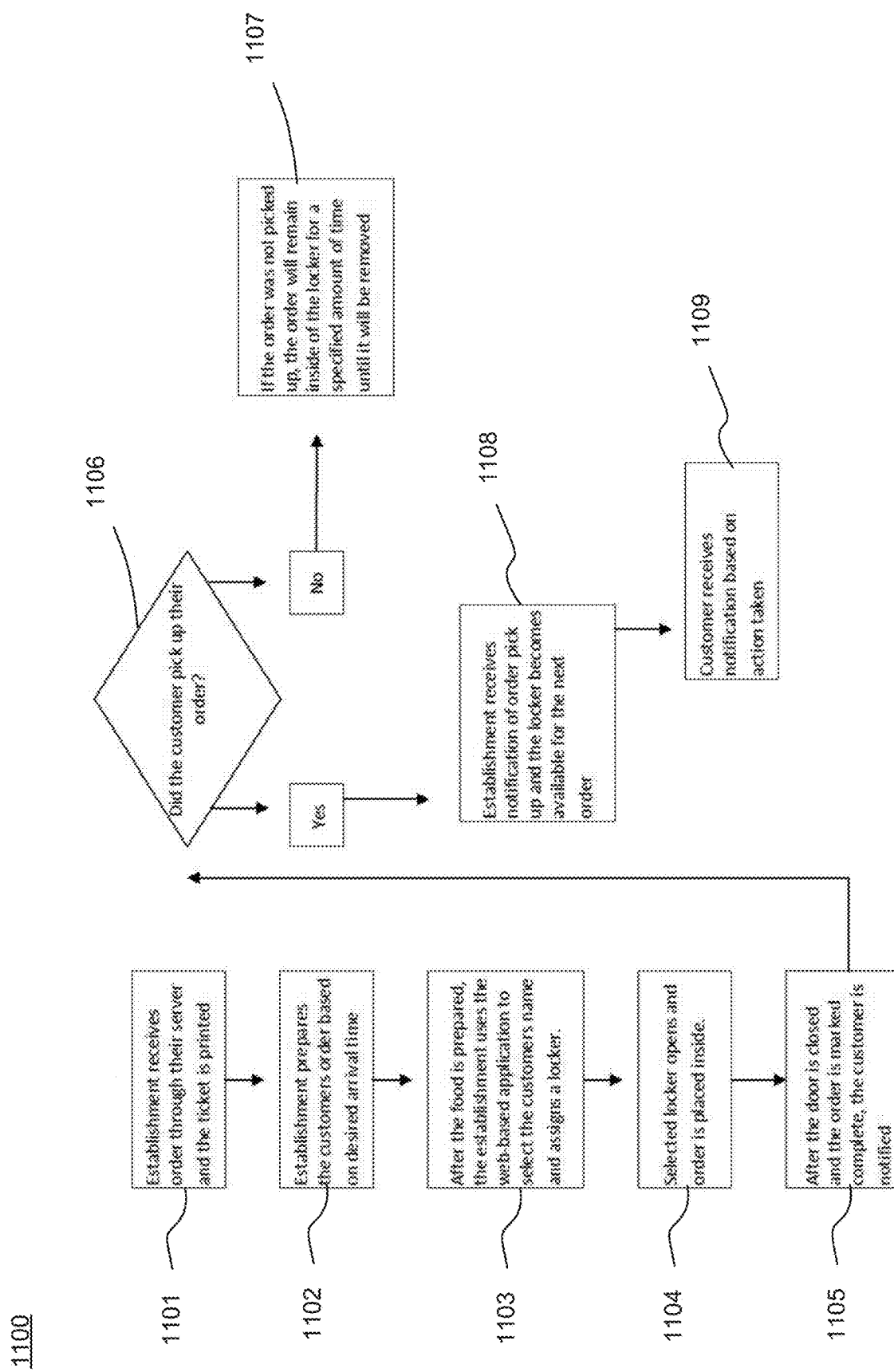
FIG. 11 illustrates a method for placing food in a contactless locker system, according to an embodiment.

FIG. 11 illustrates a method 1100 of a retrieving an order from a locker station, according to an embodiment. Some of the features in FIG. 11 are the same as or similar to some of the features in FIGS. 1-10 as noted by same and/or similar reference characters, unless expressly described otherwise. Furthermore, the elements and/or features described regarding FIG. 11 may be the same as and/or similar to other similarly named elements and/or features described and/or illustrated throughout this disclosure.

The method 1100 includes a vendor receiving an order (step 1101). The vendor prepares the order (step 1102). The vendor assigns a locker in a locker station to store the order (step 1103). The order is placed in the locker (step 1104). The customer is notified that the order is placed in the locker (step 1105). It is determined whether a customer picked up the order (step 1106). If the order was not picked up by the customer, the order remains in the locker for a specified amount of time (step 1107). If the order is picked up, the vendor receives a notification that the order is picked up (step 1108). Additionally, the customer receives a notification (step 1109).

Figure 12:
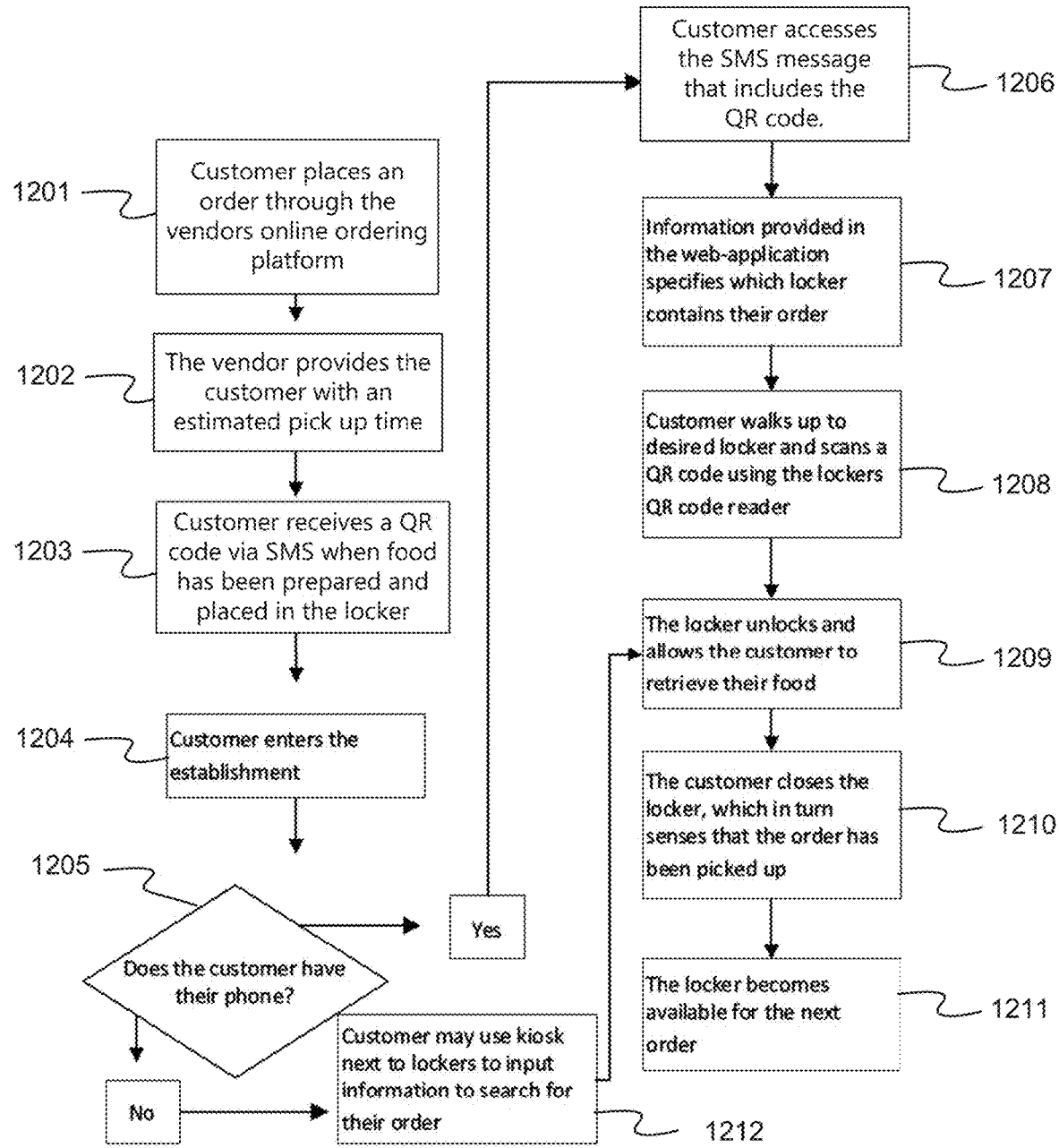
FIG. 12 illustrates a method for retrieving food in a contactless locker system, according to an embodiment.

FIG. 12 illustrates a method 1200 of a retrieving an order from a locker station, according to an embodiment. Some of the features in FIG. 12 are the same as or similar to some of the features in FIGS. 1-11 as noted by same and/or similar reference characters, unless expressly described otherwise. Furthermore, the elements and/or features described regarding FIG. 12 may be the same as and/or similar to other similarly named elements and/or features described and/or illustrated throughout this disclosure.

The method 1200 includes a customer, by a customer device, placing an order through the vendors online food ordering system (step 1201). The vendor, by a vendor device, providing the customer with an estimated pickup time. (step 1202). The customer, by the customer device, receiving a QR code via SMS when the order is prepared and placed in the locker (step 1203). The customer enters the vendor that prepared the food (step 1204). It is determined whether a customer has a mobile phone (step 1205).

If the customer has their phone, the customer accesses, by the customer device, the SMS message that includes the QR code associated with their order (step 1206). An application indicates which locker their order is placed in (step 1207). The customer scans a displayed QR code (step 1208). The locker unlocks and opens up, thereby allowing the customer to retrieve their order (step 1209). The locker is then closed (step 1210). The locker becomes available for another order (step 1211).

If it is determined that the customer does not have their mobile phone, the user may use a kiosk to input information to search for their order (step 1212). Subsequent step 1212, the locker unlocks and allows the customer to retrieve their order (step 1209).

It is to be understood that the above description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The disclosure above encompasses multiple distinct embodiments with independent utility. While these embodiments have been disclosed in a particular form, the specific embodiments disclosed and illustrated above are not to be considered in a limiting sense as numerous variations are possible. The subject matter of the embodiments includes the novel and non-obvious combinations and sub-combinations of the various elements, features, functions and/or properties disclosed above and inherent to those skilled in the art pertaining to such embodiments. Where the disclosure or subsequently filed claims recite "a" element, "a first" element, or any such equivalent term, the disclosure or claims is to be understood to incorporate one or more such elements, neither requiring nor excluding two or more such elements.

Applicant(s) reserves the right to submit claims directed to combinations and sub-combinations of the disclosed embodiments that are believed to be novel and non-obvious. Embodiments embodied in other combinations and sub-combinations of features, functions, elements and/or properties may be claimed through amendment of those claims or presentation of new claims in the present application or in a related application. Such amended or new claims, whether they are directed to the same embodiment or a different embodiment and whether they are different, broader, narrower or equal in scope to the original claims, are to be considered within the subject matter of the embodiments described herein.

The invention claimed is:

1. A locker system, comprising:
    a set of laterally adjacent lockers comprising:
        a first locker comprising a storage space configured to store a first food item prepared by a restaurant, the first locker comprising:
            a first door enabling access to the storage space by a vendor;
            a first actuation device coupled to the first door, wherein the first actuation device is configured to:
                automatically open the first door by receiving a first instruction after a first touchless input; and
                automatically close the first door after a first signal from a pressure sensor indicates that the first item of food is placed on the pressure sensor within the storage space;
            a second door opposite the first door enabling access to the storage space by a customer; and
            a second actuation device coupled to the second door, wherein the second actuation device is configured to:
                automatically open the second door by receiving a first instruction after a second touchless input; and
                automatically close the second door after a second signal from the pressure sensor indicates that the first item of food is removed from the pressure sensor;
        a controller comprising a processor configured to:
            receive a first input from a first vendor device to place the first food item prepared by the restaurant in the first locker, wherein the first vendor device is associated with the vendor that places the first food item in the first locker;

in response to receiving the first input, automatically open the first door via the first actuation device, wherein the automatically opening of the first door is accomplished without the vendor physically contacting the first locker;

detect the first food item is placed in the first locker; and in response to the first food item is placed in the first locker, automatically close the first door via the first actuation device, wherein the automatically closing of the first door is accomplished without the first user physically contacting the first locker; and while the first food item is stored in the first locker:
receive a second input from a first customer device to retrieve the first food item from the first locker, wherein the first customer device is associated with the customer that ordered the first food item from the restaurant;

in response to receiving the second input, automatically open the second door via the second actuation device, wherein the opening of the second door is accomplished without the second user physically contacting the first locker;

detect the first food item is removed from the first locker by the customer; and in response to the first food item being removed from the first locker, automatically close the second door via the second actuation device, wherein the automatically closing of the second door is accomplished without the second user physically contacting the first locker.

2. The locker system of claim 1, further comprising a kiosk communicatively coupled to the set of lockers, the kiosk comprising a user interface, wherein the second input is received at the user interface.

3. The locker system of claim 1, wherein the set of laterally adjacent lockers further comprises a scanner, wherein the second input is a quick response (QR) code scanned by the scanner.

4. The locker system of claim 1, wherein:
the first locker further comprises a sensor;
the first food item is detected to be placed in the first locker by a first signal generated by the sensor indicative of the first food item placed in the first locker; and
the first food item is detected to be removed from the first locker by a second signal generated by the sensor indicative of the first food item removed from the first locker.

5. The locker system of claim 4, wherein the sensor is a weight sensor or a pressure sensor.

6. The locker system of claim 1, wherein the set of laterally adjacent lockers further comprises a second locker configured to store a second food item prepared by the restaurant, the second locker comprising:
a third door;
a third actuation device coupled to the third door, wherein the third actuation device is configured to:
automatically open the third door; and
automatically close the third door;
a fourth door;
a fourth actuation device coupled to the fourth door, wherein the fourth actuation device is configured to:
automatically open the fourth door; and
automatically close the fourth door.

7. The locker system of claim 1, wherein the first locker further comprises:
a heater configured to maintain a first temperature range of the first food item; and
a cooler configured to maintain a second temperature range of the first food item.

8. The locker system of claim 1, wherein:
the first door is configured to allow ingress and egress to only the first locker from a first end of the first locker; and
the second door is configured to allow ingress and egress to only the first locker from a second end of the locker.

9. A method, comprising:
receiving, by a first vendor device, a first order of a first food item from a first customer device of a first customer;

while a first user of a second vendor device is not physically contacting a locker system:
receiving a first input, at a locker system, from the second vendor device to open a first door of a first locker in the locker system, wherein the first locker is one of set of laterally adjacent lockers, and wherein the first door provides access to a first storage space of the first locker;

in response to the first input, automatically opening the first door of the first locker by the locker system; and in response to the first food placed in the first locker by the first person, automatically closing the first door by the locker system;

while the first customer is not physically contacting the locker system:
receiving a second input, at the locker system from the first customer device to automatically open a second door of the first locker to retrieve the first food located in the first locker, wherein the second door provides access to the first storage space of the first locker;

in response to receiving the second input, automatically opening the second door of the first locker; and in response to the first food item removed from the first locker, automatically closing the second door of the first locker;

receiving, by a third vendor device, a second order of a second food item from a second customer device of a second customer; and while a second user of a fourth vendor device is not physically contacting the locker system:
receiving a third input, at the locker system, from the fourth vendor device to open a third door of a second locker in the locker system, wherein the second door provides access to a second storage space of the second locker;

in response to the third input, automatically opening the third door of the second locker by the locker system; and in response to the second food placed in the second locker, automatically closing the third door by the locker system; and while the second customer is not physically contacting the locker system:
receiving a fourth input, at the locker system from the second customer device to automatically open the third door or a forth door of the second locker to retrieve the second food item located in the second locker by the second customer;

in response to receiving the fourth input, automatically opening the third door or the forth door of the second locker by the locker system; and in response to the second food item removed from the second locker, automatically closing the third door or the forth door of the second locker by the locker system.

10. The method of claim 9, wherein:
the third door is an only an only first door of the second locker.

11. The method of claim 9, further comprising:
determining whether the first food item is placed within the first locker by the first user; and in response to determining that the first food is not placed within the first locker, generating an audible alert or visual alert to alert the first user that the first food is not placed within the first locker.

12. The method of claim 11, wherein the determining whether the first food item is placed within the first locker is determined by an image sensor or an electrical-mechanical sensor.

13. The method of claim 9, further comprising:
determining whether the first food item is removed from within the first locker by the first customer, wherein the determining is made by an image sensor or an electrical-mechanical sensor; and in response to determining that the first food is not removed from within the first locker, generating an audible alert or visual alert to alert the first customer that the first food is not removed from within the first locker.

14. The method of claim 9, further comprising:
detecting the first user is proximate the locker system by an image sensor; and in response to detecting the first user is proximate the locker system, generating an indication to the first user to provide the first input.

15. The method of claim 9, further comprising:
randomly assigning, by a processor coupled to the locker system, the first locker to the first order of the first food;

automatically generating, by the processor, a first scannable code associated with the first order of the first food; and transmitting, by the first vendor device, the first scannable code to the second vendor device.

16. The method of claim 15, further comprising:
automatically generating a second scannable code, by the processor, associated with the first food order of the first food item; and transmitting, by the first vendor device, the second scannable code to the first customer device.

17. A system comprising:
a locker comprising a storage space configured to store a food item prepared by a restaurant, the locker comprising:
  a first door enabling access to the storage space;
  a first actuation device coupled to the first door, wherein the first actuation device is configured to automatically open the first door in response to a first input to receive the food item into the locker
  a second door opposite the first door and enabling access to the storage space;
  a second actuation device coupled to the second door, wherein the second actuation device is configured to automatically open the second door in response a second input to retrieve the food item from the locker; and
  a controller comprising a processor configured to:
    receive the first input to place the first food item into the locker;
    automatically open the first door via the first actuation device in response to the first input;
    detect the first food item is placed into the locker;
    automatically close the first door via the first actuation device in response to the detection of the food item in the locker;
    while the first food item is detected in the locker, automatically open the second door via the second actuation device in response to receipt of a second input to retrieve the food item from the locker; and
    in response to the food item being removed from the locker, automatically close the second door via the second actuation device.

18. The system of claim 17, wherein at least one of the first input or the second input comprises a touchless input.

19. The system of claim 17, wherein the controller is configured to detect the first food item in the locker based on communication from a pressure sensor positioned in the locker.

20. The system of claim 17, wherein the controller is configured to receive the second input from a user device separate from the locker.

* * * * *